United States Patent [19]

Kretzschmar et al.

[11] Patent Number: 5,782,460
[45] Date of Patent: Jul. 21, 1998

[54] PROCESS AND DEVICE FOR THE MANUFACTURE OF MOULDINGS

[75] Inventors: Otto Kretzschmar, Einhausen; Sharla Borghorst, Frankfurt am Main; John Golby, Aschaffenburg; Peter Hagmann, Erlenbach am Main; Peter Herbrechtsmeier, Königstein; Bernhard Seiferling, Goldbach, all of Germany; Beat Müller, Marly, Switzerland

[73] Assignee: CIBA Vision Corporation, Duluth, Ga.

[21] Appl. No.: 696,138

[22] Filed: Aug. 13, 1996

Related U.S. Application Data

[63] Continuation of Ser. No. 278,477, Jul. 20, 1994, abandoned.

[30] Foreign Application Priority Data

Jul. 29, 1993 [CH] Switzerland ............... 2299/93
Aug. 6, 1993 [CH] Switzerland ............... 2350/93

[51] Int. Cl.⁶ ...................................... B29D 11/00
[52] U.S. Cl. ................ 264/1.36; 264/1.38; 264/2.2; 264/496; 264/335; 425/174.4; 425/437; 425/444; 425/449; 425/808
[58] Field of Search .................... 264/1.1, 1.36, 264/1.38, 2.2, 2.3, 298, 299, 301, 303, 102, 494, 496, 335; 425/174.4, 808, 437, 438, 444, 447, 449

[56] References Cited

U.S. PATENT DOCUMENTS

| | | | |
|---|---|---|---|
| 3,380,718 | 4/1968 | Neefe | 264/2.2 |
| 3,841,598 | 10/1974 | Grucza | 425/808 |
| 4,113,224 | 9/1978 | Clark | 249/105 |
| 4,693,446 | 9/1987 | Orlosky | 249/53 |
| 4,712,765 | 12/1987 | Sabet | 249/91 |
| 4,842,782 | 6/1989 | Portney et al. | 264/25 |
| 5,114,114 | 5/1992 | Hara | 425/808 |
| 5,218,013 | 6/1993 | Schock | 523/209 |
| 5,281,372 | 1/1994 | Hayashi et al. | 264/102 |

FOREIGN PATENT DOCUMENTS

| | | | |
|---|---|---|---|
| 107431 | 5/1984 | European Pat. Off. | |
| 255535 | 2/1988 | European Pat. Off. | |
| 264255 | 4/1988 | European Pat. Off. | |
| 318164 | 5/1989 | European Pat. Off. | |
| 361101 | 4/1990 | European Pat. Off. | |
| 366356 | 5/1990 | European Pat. Off. | |
| 367513 | 5/1990 | European Pat. Off. | |
| 484015 | 5/1992 | European Pat. Off. | |
| 506404 | 9/1992 | European Pat. Off. | 264/299 |
| 177236 | 4/1975 | New Zealand | |
| WO870439 | 7/1987 | WIPO | |

*Primary Examiner*—Mathieu D. Vargot
*Attorney, Agent, or Firm*—Michael U. Lee; R. Scott Meece

[57] ABSTRACT

In a process for the manufacture of mouldings, especially optical lenses, specifically contact lenses (CL), a starting material that is crosslinkable by the impingement of suitable energy is introduced into a mould (1) having a cavity (15), which mould is at least partially permeable to the energy concerned. The starting material is introduced into the cavity in a still at least partially uncrosslinked state, the mould cavity determining the shape of the moulding (CL) to be produced. By means of impingement of the energy concerned, the starting material is crosslinked to an extent sufficient for it to be possible for the moulding (CL) to be released from the mould. The filling of the mould cavity is carried out in the starting material that is still at least partially in the uncrosslinked state.

54 Claims, 5 Drawing Sheets

PROCESS AND DEVICE FOR THE MANUFACTURE OF MOULDINGS

This is a continuation of application Ser. No. 08/278,477 filed on Jul. 20, 1994, now abandoned.

Foreign priority is claimed under 35 USC 119 to Swiss Patent Application No. 2299/93-3, filed on Jul. 29, 1993; and Swiss Patent Application No. 2350/93-0, filed on Aug. 6, 1993.

BACKGROUND OF THE INVENTION

1. Field of the Invention

The invention relates to a process for the manufacture of mouldings, especially optical lenses and specifically contact lenses, in accordance with the preamble of the respective independent patent claim. The invention furthermore relates to mouldings, especially optical lenses and specifically contact lenses, manufactured in accordance with that process or by means of that device.

2. Related Art

Contact lenses that are to be manufactured economically in large numbers are preferably produced by so-called mould processes and specifically by the full-mould process. In those processes, the lenses are manufactured in their final form usually between two mould halves (moulds), so that neither subsequent machining of the surfaces of the lenses nor machining of the rim is necessary. Mould processes are known, for example, from WO-A-87/04390 and from EP-A-0 367 513.

In those known mould processes, the geometry of the contact lens that is to be produced is determined by the mould cavity. The rim of the contact lens is also formed by the mould, which usually consists of two mould halves. The geometry of the rim is determined by the contour of the two mould halves in the region in which they are in contact with one another.

In order to produce a contact lens, first of all a determined amount of a flowable starting material is introduced into the female mould half. The mould is then closed by applying the male mould half. Normally, the starting material is supplied in slight excess, so that the excess amount is forced into an overflow chamber externally adjacent to the mould cavity when the mould is closed. The subsequent polymerisation or crosslinking of the starting material is effected by irradiation with UV light or by thermal action or by another, non-thermal, method, during the course of which both the starting material in the mould cavity and the excess material in the overflow chamber are fully cured. The full cure of the excess material may be delayed slightly, since it may initially be inhibited by atmospheric oxygen. In order to achieve fault-free separation of the contact lens from the excess material, the excess material must be well sealed off or expelled from the zone in which the two mould halves are in contact with one another. Only in that manner is it possible to obtain fault-free contact lens rims.

The materials currently used for the moulds are preferably plastics, such as, for example, polypropylene. The moulds are produced by injection moulding and used only once (disposable moulds). The reasons for this are, inter alia, that the moulds are in some cases contaminated by the excess material, are damaged when the contact lens is separated, or are irreversibly deformed in some areas.

In the case of injection-moulded moulds, variations in the dimensions must also be expected as a result of variations in the manufacturing process (temperatures, pressures, material properties). Shrinkage of the moulds may also occur after injection moulding. The dimensional variations in the mould may lead to variations in the parameters of the contact lens being produced (vertex refractive power, diameter, base curve, middle thickness etc.), which may have an adverse effect on the quality of the lenses and thus result in a reduced yield. If the seal between the mould halves is inadequate, the excess material is not cleanly separated, which results in the formation of so-called flash at the contact lens rim. Where that is relatively pronounced, such a cosmetic fault at the rim of the lens may also cause irritation to the wearer, and such lenses therefore have to be identified by inspection and removed.

Particularly in view of the quality requirements of the contact lens rim, the moulds are also used only once, because it is not possible to rule out absolutely a certain deformation of the moulds in the region in which they are in contact with one another.

A further mould process for the manufacture of, inter alia, contact lenses is described in U.S. Pat. No. 4,113,224. That process uses a mould in which the cavity is not completely sealed but is connected by a thin annular gap to a reservoir channel (overflow channel) surrounding the cavity. During the crosslinking process, material can flow back out of the reservoir through the annular gap and into the mould cavity to compensate for the relatively large shrinkage in volume which occurs with the lens materials customarily used.

The material in the reservoir channel can be prevented from crosslinking by an inhibiting gas atmosphere or by being shielded from the energy radiation causing the crosslinking. To ensure that material flows back into the mould cavity, the material located in the mould cavity is, at least to begin with, subjected to radiation only in a central region, which is smaller than the diameter of the mould cavity, or is exposed to a stronger intensity of radiation in that central region than in the edge region of the mould cavity surrounding that central region. After crosslinking has commenced in the central region and has progressed to a certain degree, however, the material disposed in the edge region and the adjacent annular gap, and that located in the reservoir channel, is also exposed to the full radiation and crosslinked. The burrs and flash mentioned further above are inevitably formed, so that the mouldings or contact lenses manufactured by that known process require subsequent machining.

A further problem arising during manufacture according to processes described hitherto is that air inclusions may occur when the mould is closed. Air inclusions in the lenses result, however, in the lenses being identified as rejects in the subsequent inspection (quality control). The mould has hitherto been closed correspondingly slowly, so as to enable the air to escape as fully as possible from the mould cavity. The comparatively slow closure of the mould, however, takes up a relatively large amount of time.

SUMMARY OF THE INVENTION

The aim of the invention is therefore to provide a process and a device of the kind mentioned in which, inter alia, the degree of efficiency is high, that is to say the mould can be used efficiently, and in which expenditure is comparatively low, but always with the proviso that the moulding (e.g. contact lens) produced is free from air inclusions.

In respect of the process, that aim is achieved by carrying out the filling of the mould cavity in the starting material that is still at least partially in the uncrosslinked state. As a result, right from the beginning, when the mould is being filled, there can be no air in the mould, and so air inclusions are completely avoided. The mould can consequently be closed more quickly, and thus used more efficiently, while at the same time expenditure is comparatively very low. Furthermore, in that manner an exact measurement of the required amount of starting material is provided automatically, since the filling takes place in the starting material.

In one variant of the process, for the purpose of filling the mould cavity, the cavity can be connected to a reservoir which surrounds it, in which the starting material is stored and from which the mould cavity is flooded. This is a process variant that is especially uncomplicated technologically.

In a further process variant, the mould is also closed in the starting material so as to exclude the risk of air in any way getting into the mould cavity during the closing operation.

In a further variant, a mould is used that comprises a container and a mould member displaceable in the manner of a piston in that container. The mould member can be moved away from and towards the container wall lying opposite it for the purpose of opening and closing the mould. Starting material is fed in between the container wall and the mould member as the mould is opened and conveyed away again as the mould is closed. As a result of the movement of the displaceable mould member away from the opposite-lying container wall the space between the displaceable mould member and the container wall is filled with starting material without air being able to penetrate into that space. Subsequently, as a result of the movement of the displaceable mould member towards the container wall, the starting material disposed between the mould member and the container wall is conveyed away again, the material located in the mould cavity naturally remaining there. It is also impossible for any air to enter the mould cavity as the mould member moves towards the container wall, as a result of which mouldings that are free from air inclusions can be produced in a simple and efficient manner.

For example, a mould having two mould halves may be used in which one mould half is provided on the container wall and the other mould half is provided on the displaceable mould member. In that arrangement a mould having a male mould half and a female mould half may be used, the male mould half being provided on the container wall and the female mould half on the displaceable mould member. Pumps may advantageously be used to feed in and convey away the starting material. In a further advantageous process variant, the piston may be driven in order to feed in and convey away the starting material.

The crosslinked moulding can be removed from the mould in an especially simple manner by flushing out the mould with starting material. This can be effected, for example, by the moulding being separated from the mould by the flow of starting material as the mould is opened and being flushed out of the mould by the flow of starting material as the mould is closed.

In one variant of the process, in a first cycle the mould is opened and closed again. Subsequently, at least the crosslinking necessary for it to be possible for the moulding to be released from the mould is effected by the action of energy. In a second cycle the mould is opened again, the moulding being separated from the mould. The piston-like mould member is then moved towards the opposite-lying container wall again and the mould is thus closed again, the crosslinked moulding being flushed out of the mould. This "two-cycle" variant of the process is distinguished by the fact that the moulding is produced in the first cycle and then flushed out of the mould in a second cycle. The mould can simultaneously be cleaned in the "flushing cycle".

The process variant just described can be carried out either by providing first a "production cycle" (first cycle) and then a separate "flushing cycle" (second cycle, for example using a flushing liquid), or alternatively the flushing can be arranged to coincide with the production cycle of a new moulding, that is to say as new starting material is introduced into the mould cavity the moulding produced in the preceding cycle is flushed out of the mould. The "two-cycle" variant of the process then becomes a "single-cycle" variant.

The crosslinked moulding can, however, also be removed from the mould by means of a gripping device. This can be effected by depositing the moulding removed from the mould by the gripping device on the displaceable mould member outside the space between the displaceable mould member and the opposite-lying container wall. The moulding deposited on the displaceable mould member can be held fast thereto by negative pressure and then released from it again by positive pressure.

In a further process variant, the mould is not completely closed after the starting material has been introduced into the mould cavity, so that an annular gap containing uncrosslinked starting material, which gap surrounds the mould cavity and is in communication with that mould cavity, remains open. By this means on the one hand a shrinkage in volume occurring during crosslinking can be compensated by starting material flowing back through the annular gap into the mould cavity, and on the other hand the mould halves are prevented from being pressed hard against one another during manufacture of the moulding. Especially in view of the risk of the mould halves being irreversibly deformed by mechanical stress, mould halves have hitherto been used only once, as explained in the introduction. In accordance with this process variant, the mould halves can be used repeatedly.

It is also conceivable for the mould to be closed further following crosslinking shrinkage as crosslinking of the material progresses.

It is, however, in any event important to use a starting material that is of at least viscous flowability prior to the crosslinking, so that starting material can flow back through the annular gap into the mould cavity to compensate for shrinkage.

According to a further process variant, the impingement upon the material of the energy causing crosslinking is restricted spatially to the region of the mould cavity, so that substantially only the starting material located in the mould cavity, that is to say the region of the moulding, specifically of the contact lens, is crosslinked. Any excess starting material present is not polymerised or crosslinked. In that arrangement, partial areas of the moulding rim are formed not by a mechanical limitation of the material by mould walls but by a spatial restriction of the impinging energy (usually UV or some other radiation) that triggers the polymerisation or crosslinking. As a result of those two measures, contact between the two mould halves can in a preferred arrangement be avoided, so that they are not deformed and can accordingly be used again. In addition, the known problem of volume shrinkage which occurs during crosslinking can also be dealt with very simply thereby without it being necessary, as in the case, for example, of U.S. Pat No. 4,113,224, for the moulding to be mechanically processed subsequently.

In one process variant, the spatial restriction of the energy impingement is effected by masking for the mould that is at least partially impermeable to the particular form of energy used. The energy used for the crosslinking is radiation energy, especially UV radiation, gamma radiation, electron radiation or thermal radiation, the radiation energy preferably being in the form of a substantially parallel beam in order on the one hand to achieve good restriction and on the other hand efficient use of the energy.

In a further variant, the mould used is one that is highly permeable, at least at one side, to the energy form causing the crosslinking. The spatial restriction of the energy impingement is effected by parts of the mould that are impermeable or of poor permeability to the energy form.

In a further variant of the process the mould used is one that is highly permeable, at least from one direction, to the energy form causing the crosslinking. The spatial restriction of the energy impingement is effected by a mask that is impermeable or of poor permeability to the energy and that is provided outside the mould cavity on or in the mould.

In that arrangement the mask is preferably arranged in the region of the separating planes or separating faces of different parts of the mould, especially in regions of those parts that are in contact with the crosslinkable starting material.

In a further process variant, the energy causing the crosslinking is kept away from the starting material disposed in the annular gap, so that the crosslinking can occur in the mould cavity only and so that it is possible especially for starting material to flow back in order to compensate for the volume shrinkage. The mould can also be closed further following crosslinking shrinkage as crosslinking of the material progresses.

In that arrangement a material that is of at least viscous flowability prior to crosslinking is used, so that starting material can flow back through the annular gap into the mould cavity to compensate for shrinkage. If, after the moulding has been released from the mould, there is any uncrosslinked material still adhering to it, that material can be removed by washing with a suitable solvent. In any event, however, subsequent mechanical processing of the moulding is dispensed with.

In respect of the device, the aim of the invention is achieved by arranging the mould cavity, during filling, in starting material that is still at least partially in the uncrosslinked state. As a result, right from the beginning, when the mould is being filled, there can be no air in the mould, and so air inclusions are completely avoided. The mould can consequently be closed more quickly and thus used more efficiently, while at the same time expenditure is comparatively very low.

In one example embodiment the device comprises a reservoir for supplying the starting material that surrounds the mould cavity. The reservoir can be connected to the mould cavity. When the mould cavity is being filled, the reservoir is connected to the mould cavity and floods that cavity. This allows several structurally especially simple further developments, which will be explained in more precise detail.

In a further example embodiment, the device comprises means for closing the mould which is arranged in the starting material, the mould, in this case too, always being closed in the starting material so that no air can enter the mould cavity.

In an advantageous example embodiment, the mould comprises a container and a mould member displaceable in the manner of a piston in that container, which mould member can be moved away from and towards the container wall lying opposite it for the purpose of opening and closing the mould. Provided in the container is an inlet through which starting material flows in between the container wall and the mould member as the mould is opened. Also provided in the container is an outlet through which starting material flows out again as the mould is closed. This example embodiment is structurally comparatively simple, that is to say not very complicated, and is therefore well suited to practical use.

The mould in that arrangement preferably has two mould halves, one mould half being provided on the container wall and the other on the displaceable mould member. The mould has (especially in the manufacture of contact lenses) a male mould half and a female mould half. Preferably, the male mould half is provided on the container wall and the female mould half on the displaceable mould member. In that arrangement the moulding (contact lens) can later be released from the mould especially simply.

Pumps are preferably provided for feeding in and/or conveying away starting material which, as the mould is opened, feed in starting material through the inlet and between the container wall and the mould member and, as the mould is closed, convey it back through the outlet. Such pumps operate reliably and therefore do not represent any special expenditure.

In a further example embodiment, means are provided for driving the mould member that is displaceable in the manner of a piston. Those means may be provided, both in a device that works without and in a device that works with pumps, for the purpose of moving the mould member displaceable in the manner of a piston in the direction towards the opposite-lying container wall and thus forcing starting material disposed between the mould halves out again.

In a further example embodiment of the device, means are provided for producing a flow. That flow separates the moulding from the mould when the mould is opened and flushes the moulding out of the mould when the mould is closed. Those means may be in the form of jets or similarly acting means. It is important that they produce a flow or a turbulence in the starting material disposed between the mould halves so that the moulding (contact lens) is lifted off the mould half by means of the flow or turbulence.

In a further example embodiment of the device, in a first cycle ("production cycle") starting material first of all flows in through the inlet and between the container wall and the displaceable mould member and then flows back out through the outlet. The energy source then acts upon the mould with an amount of energy necessary for it to be possible for the moulding to be released from the mould, so that crosslinking occurs. Then, in a second cycle, for example starting material again flows in through the inlet and between the container wall and the displaceable mould member, separates the moulding from the mould and flushes it out through the outlet.

That "two-cycle" device is distinguished by the fact that in the first cycle the moulding is produced, and then in the second cycle (flushing cycle, cleaning cycle) the moulding is flushed out of the mould and the mould is also simultaneously cleaned.

That device may either be so constructed that, as described, there is first of all a "production cycle" (first cycle) and then a separate "flushing cycle" (second cycle), or alternatively it may be so constructed that the flushing out coincides with the production cycle of a new moulding, that is to say, as new starting material is introduced into the mould cavity, the moulding produced in the preceding cycle is flushed out of the mould. The "two-cycle" device then becomes a "single-cycle" device. In the "single-cycle" device, however, starting material must be used for flushing, whereas in the "two-cycle" device the use of a special cleaning liquid in the flushing cycle is also possible.

To remove the moulding, a gripping device may be provided that removes the crosslinked moulding from the mould. For that purpose the container preferably has on a container wall other than the shape-giving face a hollow or recess that extends substantially in the direction of movement of the displaceable mould member. The gripping device is arranged in that hollow or recess. The displaceable mould member comprises, on an outer wall that does not lie opposite the shape-giving container wall, an indentation in which the gripping device deposits the removed moulding. This is a structurally especially advantageous and simple arrangement of the device.

In a possible further development of that device the displaceable mould member comprises a channel that leads to the indentation and can be connected to a negative pressure or positive pressure source. The channel is connected to the negative pressure source when the gripping device deposits the removed moulding in the indentation of the mould member. In order to release the lens it is then connected to the positive pressure source. By this means the lens can be produced during one cycle and removed, deposited on the mould member and then taken off the mould member during the next cycle. This is possible both in a device constructed as a "two-cycle" device and in a device constructed as a "single-cycle" device.

In a further example embodiment of the device, the mould is provided with spacers that hold the two mould halves a small distance apart from one another when the mould is in the closed position, so that an annular gap that surrounds the mould cavity and is in communication therewith is formed.

By that means, on the one hand volume shrinkage occurring during crosslinking can be compensated, since starting material can flow back into the mould cavity through the annular gap. On the other hand the spacers prevent the mould halves from being pressed hard against one another during production of the moulding. Particularly in view of the risk of the mould halves being irreversibly deformed as a result of mechanical stress, mould halves have hitherto been used only once, as explained in the introduction. Using this example embodiment of the device it is possible for the mould halves to be used repeatedly. It is furthermore possible in a further development of the device for the mould to be provided with resilient means or displacement means that allow the two mould halves to move closer together following crosslinking shrinkage.

In a further example embodiment, means are provided that restrict the impingement of energy upon the mould to the region of the mould cavity, so that substantially only the starting material located in the mould cavity, that is to say the region of the moulding, specifically of the contact lens, is crosslinked. Any excess starting material present is not polymerised or crosslinked. In that arrangement, partial areas of the moulding rim are formed not by a mechanical limitation of the material by mould walls but by a spatial restriction of the impinging energy (usually UV radiation or another form of radiation) that triggers the polymerisation or crosslinking. As a result of those two measures, in a preferred arrangement contact between the two mould halves can be avoided, so that they are not deformed and can accordingly be used again. In addition, the known problem of volume shrinkage which occurs during crosslinking can be dealt with very simply thereby without it being necessary, as in the case, for example, of U.S. Pat. No. 4,113,224, for the moulding to be mechanically processed subsequently.

In a further development of the example embodiment just mentioned, the mould is provided with a mask that is impermeable or of poor permeability to the energy, which mask screens from the energy all cavities, with the exception of the mould cavity, that may contain uncrosslinked material and all mould faces that may come into contact with the material. In that arrangement the mould may comprise two mould halves that are separated along a separating face, and the mask is arranged outside the mould cavity on one of the two mould halves and/or on both mould halves in the region of the separating face.

In a further example embodiment of the device, the energy source produces UV-radiation, and at least one of the halves of the mould consists of UV-permeable material, especially quartz. The mask in that arrangement may consist of a layer of material that is impermeable to UV radiation, especially a chrome layer. In the example embodiment of the device having an annular gap, the mask may be arranged in the region of the annular gap.

In the example embodiments of the device in which the crosslinking is restricted spatially to the region of the mould cavity, the mould may naturally also be provided with resilient means or displacement means that allow the two mould halves to move closer together following crosslinking shrinkage.

In particular, mouldings, especially optical lenses and specifically contact lenses, can be manufactured in accordance with the process and using the device described.

BRIEF DESCRIPTION OF THE DRAWINGS

The invention is explained in detail in the following with reference to the drawings, which are at least partly in diagrammatic form or in section.

DESCRIPTION OF THE PREFERRED EMBODIMENTS

Figure 1C:
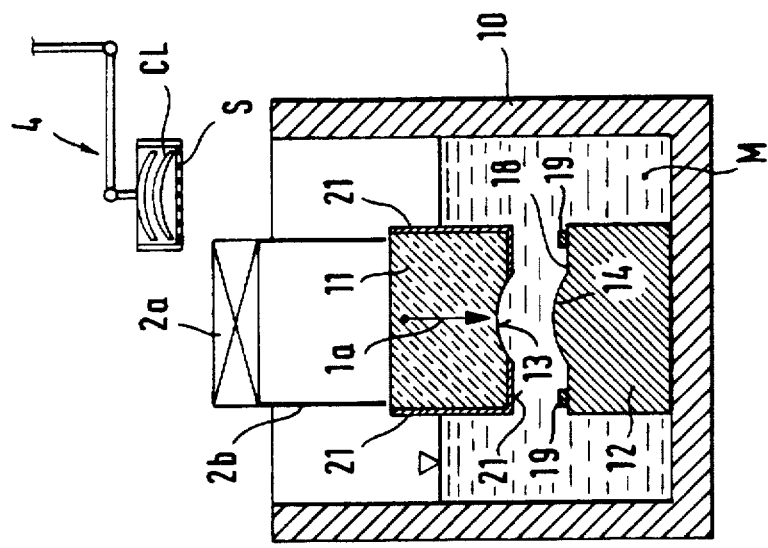
FIGS. 1A–1C show an example embodiment of the device according to the invention.
Figure 1B:
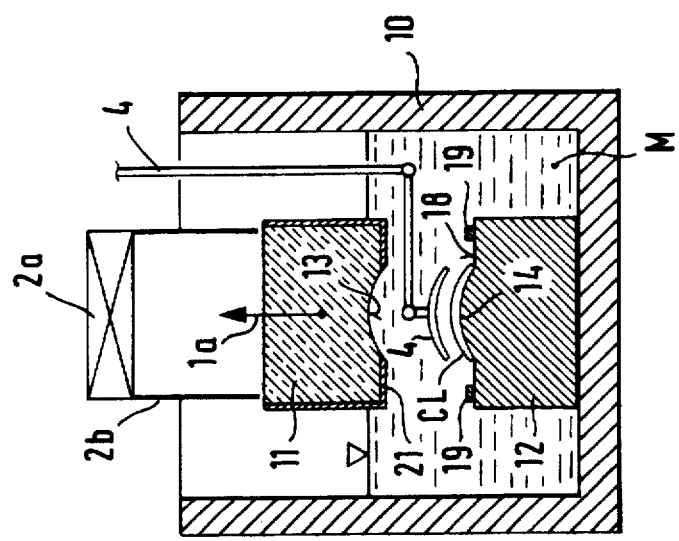
Figure 1A:
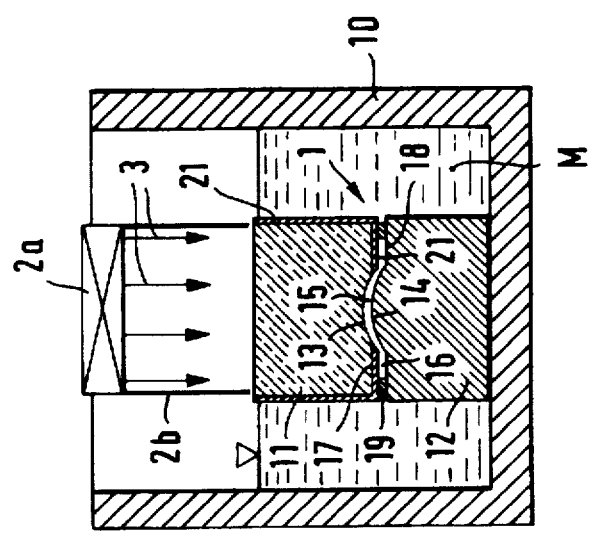

The example embodiment of the device according to the invention shown in FIGS. 1A–C is designed for the manufacture of contact lenses from a liquid starting material that can be polymerised or crosslinked, for example, by UV radiation. FIG. 1A shows the mould 1 in the closed position. The mould 1 is arranged in a container 10 that is full of uncrosslinked liquid starting material M. The device furthermore comprises an energy source in the form of a UV light source 2a, and also means 2b that direct the energy supplied by the UV light source 2a onto the mould 1 in the form of a parallel beam 3. Those means 2b may especially also comprise a shutter that is arranged between the UV light source 2a and the container 10. The UV light source 2a and the means 2b can obviously also be combined into a single unit.

Details on the general construction and on questions concerning dimensions, material and stability etc., as well as, for example, on suitable materials for the mouldings and on aspects concerning processing technology, are dealt with very comprehensively in EP-A-0367 513 and especially in U.S. Pat. No. 4,113,224, and those documents are therefore expressly declared to be an integral part of the present description (incorporation by reference).

The mould 1 comprises two mould halves 11 and 12, each of which has a curved mould face 13 and 14, respectively, which together define a mould cavity 15 which in turn determines the shape of the contact lens CL to be produced. The face 13 of the upper mould half 11 is concave and determines the front face with the rim area adjacent thereto. That mould half 11 is usually referred to as the female mould half. The face 14 of the lower mould half 12 is convex and determines the rear or base face of the contact lens, and the rim area thereof adjacent thereto. That mould half 12 is usually referred to as the male mould half.

Unlike the moulds known, for example, from the documents WO-A-87/04390 or EP-A-0 367 513 mentioned in the introduction, the mould cavity is not completely and tightly sealed but, in the example embodiment shown, is open all the way round in the region of its circumferential rim, which defines the rim of the contact lens CL to be produced. The mould cavity 15 is also in communication there with a relatively narrow annular gap 16, as is also the case in the moulds shown in U.S. Pat. No. 4,113,224. The annular gap 16 is limited by a flat mould wall 17 on the female mould half 1 and a flat mould wall 18 on the male mould half 12. To prevent complete closure of the mould, spacers in the form of spacer bolts 19 are provided on the male mould half 12 which keep the female mould half 11 at a distance, that is to say prevent complete closure of the mould and thus define the annular gap 16. The spacer bolts may be adjustable (for example by means of a thread not shown, provided in the male mould half) or may alternatively be of resilient construction. In that manner the two mould halves 11 and 12 can be moved towards one another during the crosslinking operation by adjusting the spacers or against a resilient force in order to compensate for shrinkage. The mould can obviously be opened and closed in the usual manner, for example by means of a closing unit indicated here by the arrow 1a only. Adjustment of the distance between the two mould halves to compensate for shrinkage can also be carried out, for example, by means of that external closing unit.

In another arrangement, not shown here, a number of segment-shaped gaps may be provided instead of the continuous annular gap 16 and the spacers 19, the intermediate spaces between the individual segment gaps taking over the function of the spacers. Obviously, other configurations are also possible.

The two mould halves 11 and 12 consist of a material that is as permeable as possible to the selected energy, which in this case, as already mentioned, is, for example, UV light, for example they consist of polypropylene usually used for such purposes or of another polyolefin. Since the irradiation with UV light is in this case from one side only, that is from above, it is actually necessary only for the upper, that is to say in this case the female, mould half 11 to be UV-permeable. Obviously, the same applies also for irradiation from below through the male mould half 12. According to an especially expedient and advantageous arrangement of the invention, at least the mould half that is irradiated with UV light consists of quartz. Not only does that material have especially good UV permeability but it is also very hard and resistant, so that moulds made from it can very readily be reused. A prerequisite for that, however, which is disclosed in further detail in the following, is that the mould is closed either without force or not fully, so that the mould halves are not damaged by contact. UV-permeable special glasses or sapphire are possible alternatives to quartz. On account of the fact that the mould or mould halves can be re-used, expenditure on their manufacture may be relatively high in order to obtain moulds of extremely high precision and reproducibility. Since the mould halves do not touch in the region of the lens being produced, that is to say in the region of the mould cavity 15 or of the actual mould faces, damage by contact is excluded. A high degree of durability of the moulds is thereby assured. This also has favourable consequences in general for the reproducibility of the contact lenses or mouldings being produced.

The space between the two mould halves 11 and 12 and thus also the mould cavity 15 is arranged in the uncrosslinked starting material M for the entire production process. In accordance with the general concept of the invention, in any event at least the mould cavity is arranged completely in the starting material in its uncrosslinked state during filling. FIG. 1B shows that the upper mould half 11, even in the opened position, is not completely clear of the starting material M, the space between the mould halves 11 and 12 always remaining below the liquid surface of the starting material M disposed in the container 10. Consequently, the space between the two mould halves, and especially also the mould cavity, are always in communication with the starting material M disposed in the container 10. As a result air can at no time enter the space between the two mould halves 11 and 12.

When the mould cavity is full and the mould is closed (FIG. 1A), the mould is impinged upon by UV rays 3 and the moulding is thus crosslinked.

After crosslinking, the mould is opened and the moulding in the form of the contact lens CL is released from the mould, that is to say taken off and removed from the mould. There is shown symbolically in FIG. 1C for that purpose a gripping device 4 which, when the upper mould half has been raised, takes the contact lens CL off the male mould half 12 (FIG. 1B) and removes it from the mould (FIG. 1C). The release and removal of the contact lens or moulding from the mould may, however, also be carried out by other means, as will be explained by way of the other example embodiments. After removal of the contact lens or moulding, the mould can be closed again and a new contact lens CL produced.

Since the entire production process according to FIGS. 1A–C takes place below the liquid surface of the starting material M in the container 10, no air can enter the space between the two mould halves 11 and 12 or, in particular, the mould cavity 15. Since the mould is opened and closed below the liquid surface, the mould can also be closed comparatively quickly, which was not possible with the processes and devices according to the state of the art. It is thus possible for contact lenses that are free from any air inclusions to be produced efficiently and with low expenditure.

In the example embodiment shown in FIGS. 1A–C, in addition impingement of UV rays upon the mould is restricted to the material in the mould cavity 15, that is to say only the material disposed in the mould cavity 15 is crosslinked. In particular, the starting material in the annular gap 16, which surrounds the mould cavity 15, and the remainder of the starting material M disposed in the container 10 are not impinged upon by energy and are not crosslinked. "Mould cavity" therefore here denotes that cavity of the closed mould which is defined by the complete contour of the moulding to be produced, specifically therefore the contact lens CL. The annular gap 16 opening into the mould cavity does not, therefore, form part of the mould cavity 15 here.

For realisation in practice, according to FIGS. 1A–C there is provided on the mould wall 17, in the region of the annular gap 16, a mask 21 that is impermeable (or at least of poor permeability compared with the permeability of the mould) to the energy used, in this case therefore UV light, which mask extends right up to the mould cavity and, with the exception of the mould cavity, screens from the radiated energy all remaining parts, cavities or surfaces of the mould that are in contact with or may come into contact with the here liquid uncrosslinked, possibly excess, material. Partial areas of the lens rim are formed not by a limitation of the material by mould walls but by a spatial restriction of the radiation or other energy triggering polymerisation or crosslinking. The side walls of the upper mould half are also provided with the mask 21 so as to prevent the starting material M that surrounds the mould in the container 10 from being crosslinked.

In the case of UV light, the mask may preferably be a thin chrome layer, which can be produced according to processes as known, for example, in photo and UV lithography. Other metals or metal oxides may also be suitable mask materials. The mask can also be coated with a protective layer, for example of silicon dioxide if the material used for the mould or mould half is quartz. The mask does not necessarily have to be fixed but could, for example, be constructed or arranged to be removable or exchangeable. It could, in principle, be provided anywhere at or on the mould as long as it was able to fulfill the function for which it was intended, namely the screening of all areas of the mould carrying uncrosslinked material with the exception of the mould cavity. Preferably, the mask is arranged on, or just below, a wall surface that is in contact with the uncrosslinked starting material, since in that manner undesired diffraction and scattering effects can be substantially excluded. That is not, however, absolutely essential. In principle it is even possible to dispense with a mask or masking in or on the mould if the energy impingement can be restricted locally to the mould cavity by some other means, where necessary taking into consideration the optical effect of the mould. In the case of UV radiation this could be achieved, for example, by a spatially restricted light source, a suitable lens arrangement optionally in combination with external masks, screens or the like and taking into consideration the optical effect of the mould.

Figure 2C:
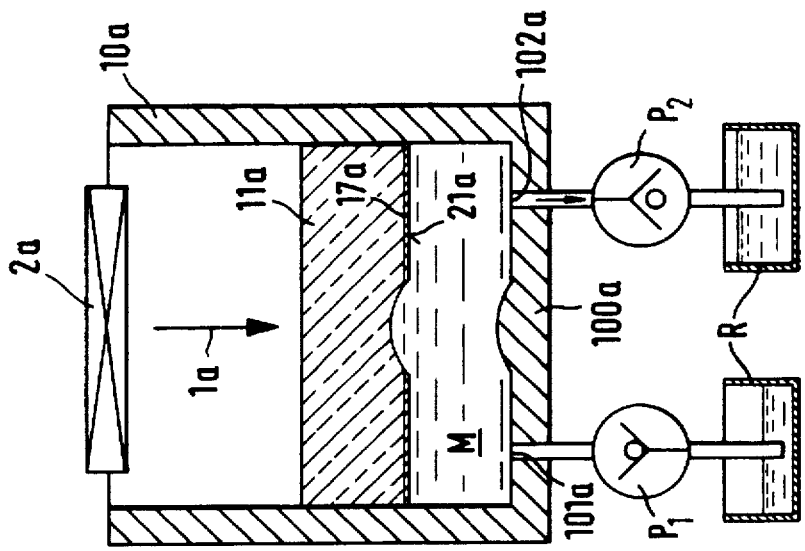
FIGS. 2A–2C show a further example embodiment of the device according to the invention.
Figure 2B:
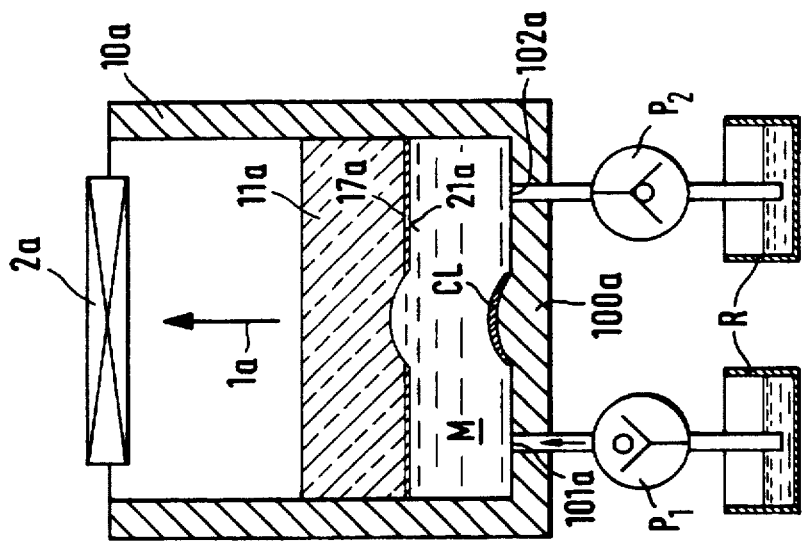
Figure 2A:
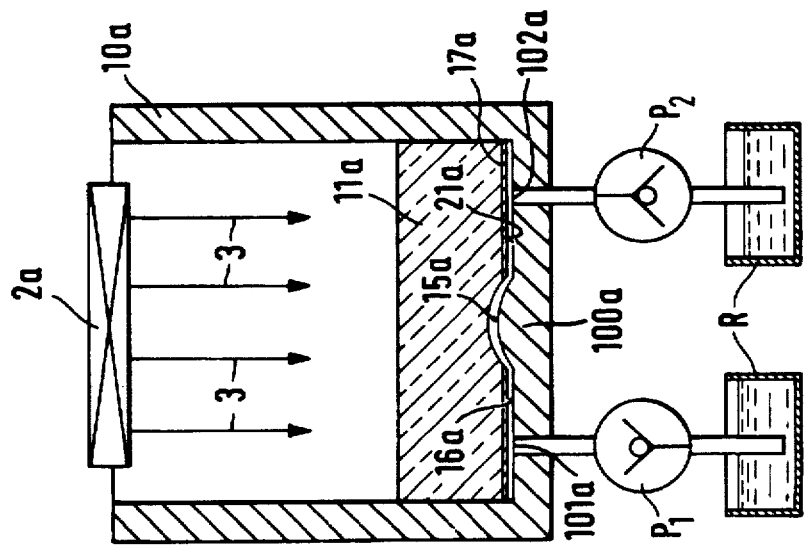

A further example embodiment of the device according to the invention is shown in FIGS. 2A–C. In that example embodiment one mould half, in this case the male mould half, is formed by one wall of a container 10a, in this case the container base 100a. The male mould half is thus formed directly on the container base 100a. Also provided in the container 10a is a mould member 11a displaceable in the manner of a piston, which can be moved away from the container wall lying opposite it, in this case the container base 100a, and back towards the container base, while maintaining a seal along the side walls of the container. The mould can therefore be opened and closed in that manner. The mould member 11a is correspondingly formed as the female mould half on its face 17a that faces the container base. Container base 100a and mould face 17a define the mould cavity 15a when the mould is in the closed position (FIG. 2A). Naturally, the mould member does not necessarily have to be constructed in the form of a piston and it would equally be possible for a diaphragm to be provided to which the mould half was attached. Other methods of altering the volume are also possible.

Provided in the container 10a, in this case the container base 100a, is an inlet 101a through which starting material can flow into the space between the mould member 11a and the container base 100a. The space between the mould member 11a and the container base 100a is for that purpose continuously in communication with a reservoir R. By means of pumps P1 and P2 at the inlet 101a and outlet 102a respectively, starting material can be conveyed to and from the space between mould member 11a and container base 100a, it being important for the space between mould member 11a and container base 100a always to be filled with starting material M so that no air can penetrate into that space. The pumps P1 and P2 are represented with an integrated non-return valve, but it is also possible to use pumps without an integrated non-return valve and to connect the valve separately between pump and container or, depending on the type of pump, to dispense with such a non-return valve completely.

When the mould is in the closed position (FIG. 2A), it is impinged upon by energy, in this case again UV radiation 3. In this case, too, the impingement of energy upon the mould is, for example, from above. Crosslinking is caused thereby. The crosslinked moulding CL is then lifted from the mould and removed from the mould. For that purpose, first of all liquid starting material M is fed by means of the pump P1 through the inlet 101a into the space between the container base 100a and the mould member 11a, and the piston-like mould member 11a is moved upwards (FIG. 2B). The moulding, in this case in the form of the contact lens CL, can then be separated from the mould and removed. That can be effected, for example, by means of a special gripping device, as already described with reference to FIG. 1. The contact lens CL can, however, equally be flushed out of the mould, as will be explained in more detail in the following.

The mould member 11a displaceable in the manner of a piston is then moved downwards again and the material disposed between the mould member 11a and the container base 100a is conveyed away through the outlet 102a (FIG. 2C). The material can be conveyed away by means of the pump P2 provided at the outlet.

It is, in principle, possible here for the mould member 11a displaceable in the manner of a piston to be driven solely by the liquid starting material fed in and conveyed away from between mould member 11a and container base 100a, so that the pumps P1 and P2 supply the driving energy necessary therefor. It is also possible for there to be no pumps at all and for the mould member 11a displaceable in the manner of a piston to be driven mechanically, that is to say for starting material to be sucked in during the upward movement and forced back out again during the downward movement. Obviously combinations with pumps and a mechanical drive are also possible.

A mask 21a is provided on the mould member 11a. In a similar manner to that described for the upper mould half 11 in FIGS. 1A–C, it extends over the annular gap 16a up to the mould cavity 15a, and also optionally along the side walls of the mould member 11a displaceable in the manner of a piston. If the mould is then impinged upon by UV radiation 3, crosslinking occurs in the region of the mould cavity 15a only, with consequent formation of the moulding. The material in the remaining areas, especially in the annular gap 16a, and also other starting material in the container 10a, is not cross-linked. In principle, the same considerations in respect of the materials and the production and mounting of such masks as those already made in the explanations of FIGS. 1A–C apply here too.

Figure 3A:
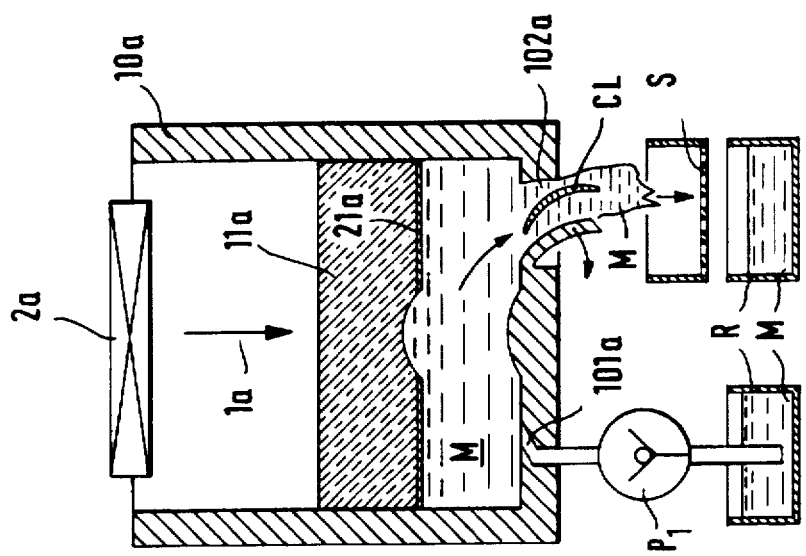
FIGS. 3A–3C show a variant of the example embodiment of FIG. 2, FIGS. 4A–4C show a further example embodiment of the device according to the invention.
Figure 3B:
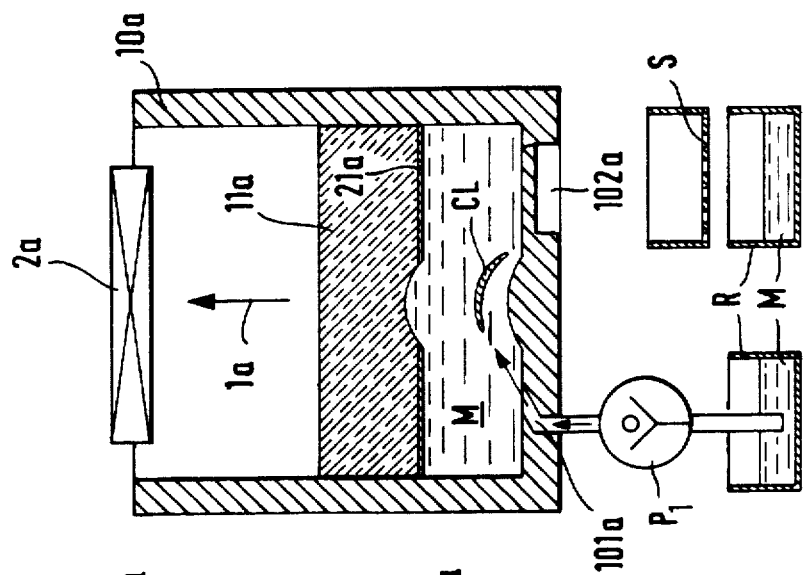
Figure 3C:
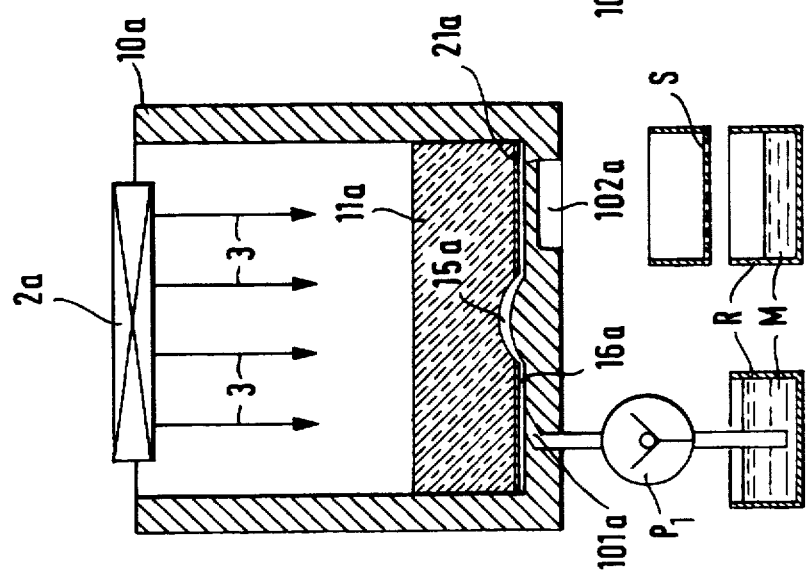

FIGS. 3A–C show an example embodiment of the device that in principle is very similar to the example embodiment of FIGS. 2A–C. One difference, however, is that no pump P2 is provided at the outlet 102a in the example embodiment according to FIGS. 3A–C, but the outlet 102a is constructed as a deformable flap or plate or as a trap door. In the explanation of FIGS. 3A–C, especially the release from the mould of the moulding, in this case therefore of the contact lens CL, will be described in detail in the following. The filling of the mould cavity 15a is carried out analogously to the example embodiment according to FIGS. 2A–C by means of the pump P1. When the mould is in the closed position (FIG. 3A), the contact lens CL is produced by crosslinking by impingement of UV radiation 3 upon the mould.

As the piston-like mould member 11a (FIG. 3B) moves upwards, liquid starting material flows into the container 10a between the container base 100a and the mould member 11a displaceable in the manner of a piston. The inlet 101a may be constructed as a jet or similarly acting flow-producing means. As the liquid starting material is fed through the inlet, the crosslinked contact lens CL is lifted from the mould by the flow produced and, with appropriate arrangement of the jet, is flushed towards the outlet 102a, which in this case is constructed as a deformable flap or plate. During the downward movement of the piston-like mould member 11a (FIG. 3C), the flap is deformed downwards by the pressure generated and opens the outlet 102a, so that the liquid starting material together with the contact lens CL can be flushed out through the outlet 102a. The contact lens can be collected in a sieve S that is permeable to the liquid starting material. The starting material may, for example, be recycled and reused, where necessary after it has been cleaned. While the contact lens is being flushed out, the mould cavity 15a is filled with new starting material, so that a new contact lens CL can immediately be crosslinked by the impingement of UV radiation 3.

It has been described above that, for the purpose of lifting off and flushing out, liquid starting material is fed into the container 10a, in the same cycle the mould cavity 15a is filled again and, with the mould in the closed position, the mould is again impinged upon by UV radiation 3 for the purpose of crosslinking and producing the next contact lens CL. The device thus operates, as it were, as a "single-cycle" device, since in each cycle (upward and downward movement of the piston-like mould member 11a) a contact lens is produced and flushed out of the mould.

It is, however, also possible for the production of the contact lens to be carried out in a first cycle ("production cycle"), that is to say for the piston-like mould member 11a to be moved upwards, for liquid starting material to flow between the mould member 11a and the container base 100a and then for the mould member 11a to be moved downwards again. In the closed position the mould is then impinged upon by UV radiation 3, as a result of which crosslinking occurs and the contact lens CL is thus produced. Then, in a separate second cycle ("flushing cycle"), the contact lens can be flushed out of the mould without a new contact lens being produced in that second cycle, whereas in the "single-cycle" device a new contact lens CL is again produced. For the flushing operation in the "two-cycle" device, it is therefore possible to use liquid starting material, but it is also possible, in particular, to use a separate cleaning liquid. This is of advantage in as much as the mould can be especially well cleaned on the inside during the flushing cycle before starting material flows in again in the next cycle and the next contact lens CL is produced. In the example embodiment according to FIGS. 3A–C, therefore, both a "single-cycle" operation (a contact lens is produced in every cycle) and a "two-cycle" operation (a contact lens is produced in the first cycle and in the second cycle it is flushed out and the mould cleaned without a new contact lens being produced) are possible.

Figure 4A:
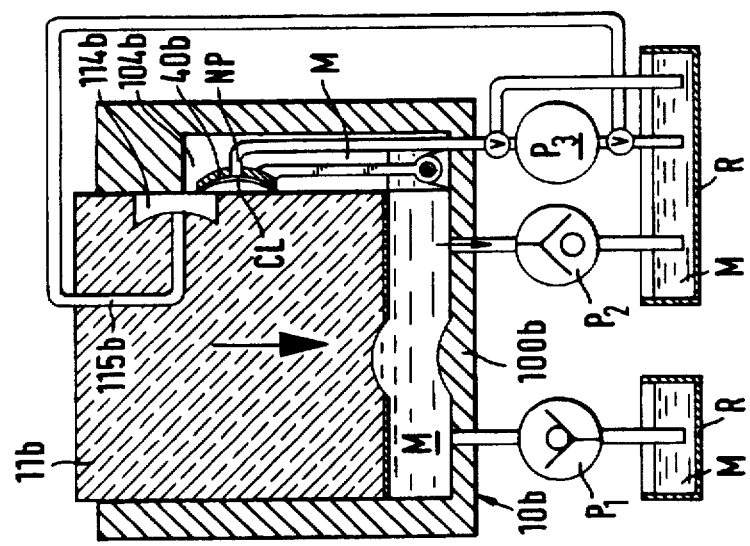
Figure 4B:
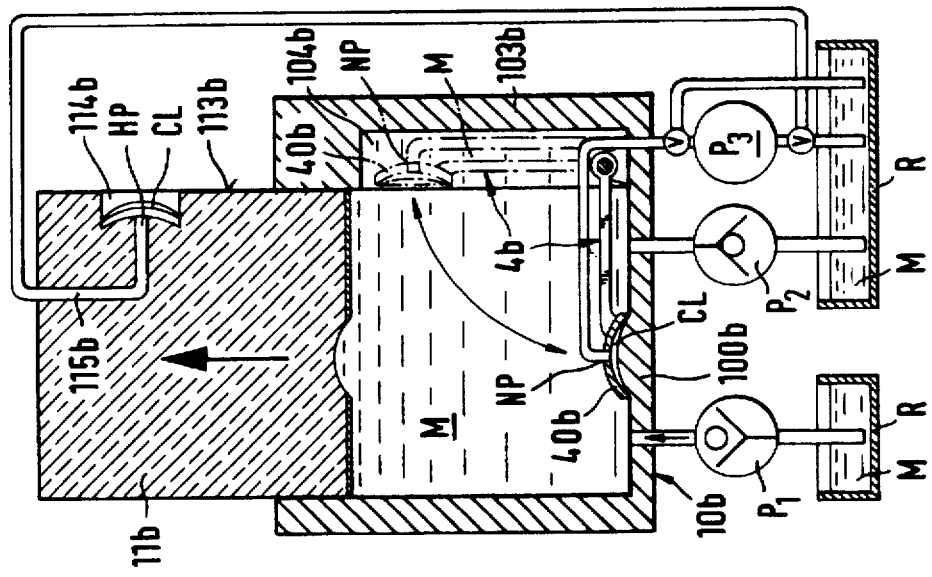
Figure 4C:
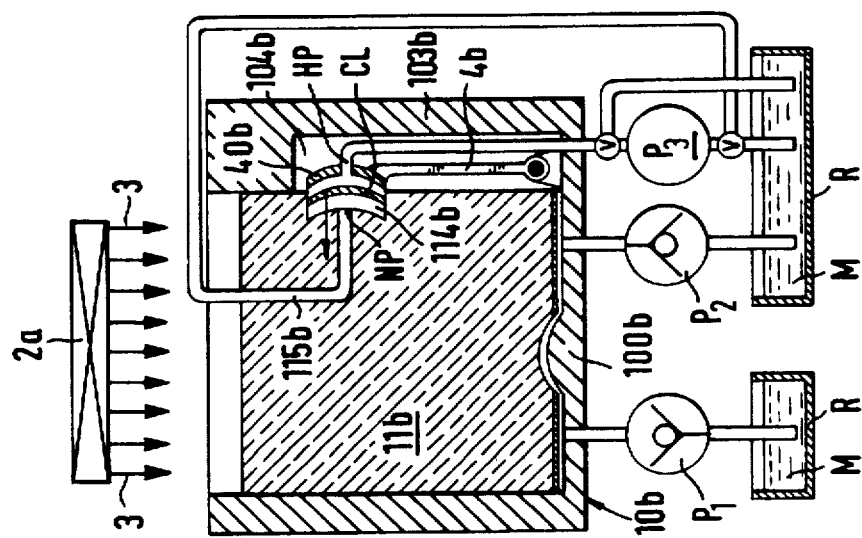

A further example embodiment of the device according to the invention is shown in FIGS. 4A–C. That example embodiment is in principle also similar to the example embodiments described with reference to FIGS. 2A–C and FIGS. 3A–C, but differs significantly from those in that it comprises a somewhat differently constructed mould member 11b displaceable in the manner of a piston. In addition, the container 10b is also significantly differently constructed in the respect that there is provided in one of its side walls 103b a hollow or recess 104b which extends in the direction of movement of the piston-like mould member 11b. Arranged in that recess 104b is a gripping device 4b. The mould member 11b has an indentation 114b on its outer wall 113b exactly in the region in which the recess 104b is provided in the side wall 103b of the container 11b. The mould member 11b furthermore comprises a channel 115b which can be connected to a negative pressure source and positive pressure source P3. The gripping device 4b can also be connected to that negative pressure and positive pressure source P3.

The manufacture of the contact lens CL by crosslinking by means of impingement of UV radiation 3 upon the mould is carried out in the same manner as already described with reference to FIGS. 2A–C and FIGS. 3A–C. The explanation of FIGS. 4A–C is therefore directed mainly to the manner in which the contact lens CL is removed from the mould. When the mould is in the closed position, the mould is again impinged upon by UV radiation 3 and the contact lens CL is produced by crosslinking (FIG. 4A). Starting material is then pumped by means of the pump P1 between the mould member 11b and the container base 100b, and the mould member 11b is moved upwards (FIG. 4B). The gripping device 4b is then pivoted out of the recess 104b and over the contact lens CL.

The gripping device 4b has a borehole in its gripper plate 40b through which negative pressure is then applied by means of the negative pressure source P3, so that the contact lens CL is lifted and sucked towards the gripper plate 40b. When the contact lens CL has been sucked against the gripper plate 40b, the gripping device 4b is pivoted back into the recess 104b and the mould member 11b is moved downwards again. As that happens, the liquid starting material disposed between mould member 11b and container base 100b is sucked away by means of the pump P2 (FIG. 4C).

The gripping device 4b disposed in the recess 104b at the same time either glides along the outer wall 113b of the mould member 11b or is held in the recess 104b until the gripper plate 40b is located opposite the indentation 114b on the outer wall of the mould member 11b. At that point positive pressure is applied through the borehole in the gripper plate 40b, so that the contact lens CL is released from the gripper plate 40b and deposited in the indentation 114b. Negative pressure is applied through the channel 115b leading to the indentation 114b at the same time as the contact lens CL is released from the gripper plate 40b, so that the contact lens CL is simply deposited by the gripper plate 40b in the indentation 114b (FIG. 4A).

When the mould member 11b has been moved upwards, the indentation 114b of the mould member 11b is located outside the container 10b (FIG. 4B). If positive pressure is then applied through the channel 115b, the contact lens CL is released from the indentation 114b and can be conveyed away for further processing. In this connection it should in particular be noted that the side wall 103b can also be extended even further upwards and can have a further recess in which the contact lens CL can be deposited or into which it can be flushed. By that means even better guidance of the mould member 11b and preservation of its corresponding sealing faces, which glide along the container wall, is achieved.

In FIGS. 4A–C the pump P3 is provided for the application of positive pressure or negative pressure, the positive pressure connection HP and negative pressure connection NP of which pump are connected to the channel 115b or the borehole in the gripper plate 40b depending on the position of the mould member displaceable in the manner of a piston. The pump P3 can suck starting material out of the reservoir R in which the starting material is stored, by means of which the necessary pressure is generated. FIGS. 4A–C show at the inlet 101b and at the outlet 102b two separate reservoirs into which the pumps P1 or P2 and P3 respectively project, but obviously it is also possible for there to be one reservoir only.

It should be noted at this point that also the example embodiment according to FIGS. 4A–C can operate both as a "single-cycle" device and as a "two-cycle" device. It must, however, be ensured in the case of the "single-cycle" device that it is always only starting material that flows into the container 10b. In the "two-cycle" device, on the other hand, in the second cycle in which the contact lens CL is also removed, a cleaning liquid can be fed in.

Figure 5:
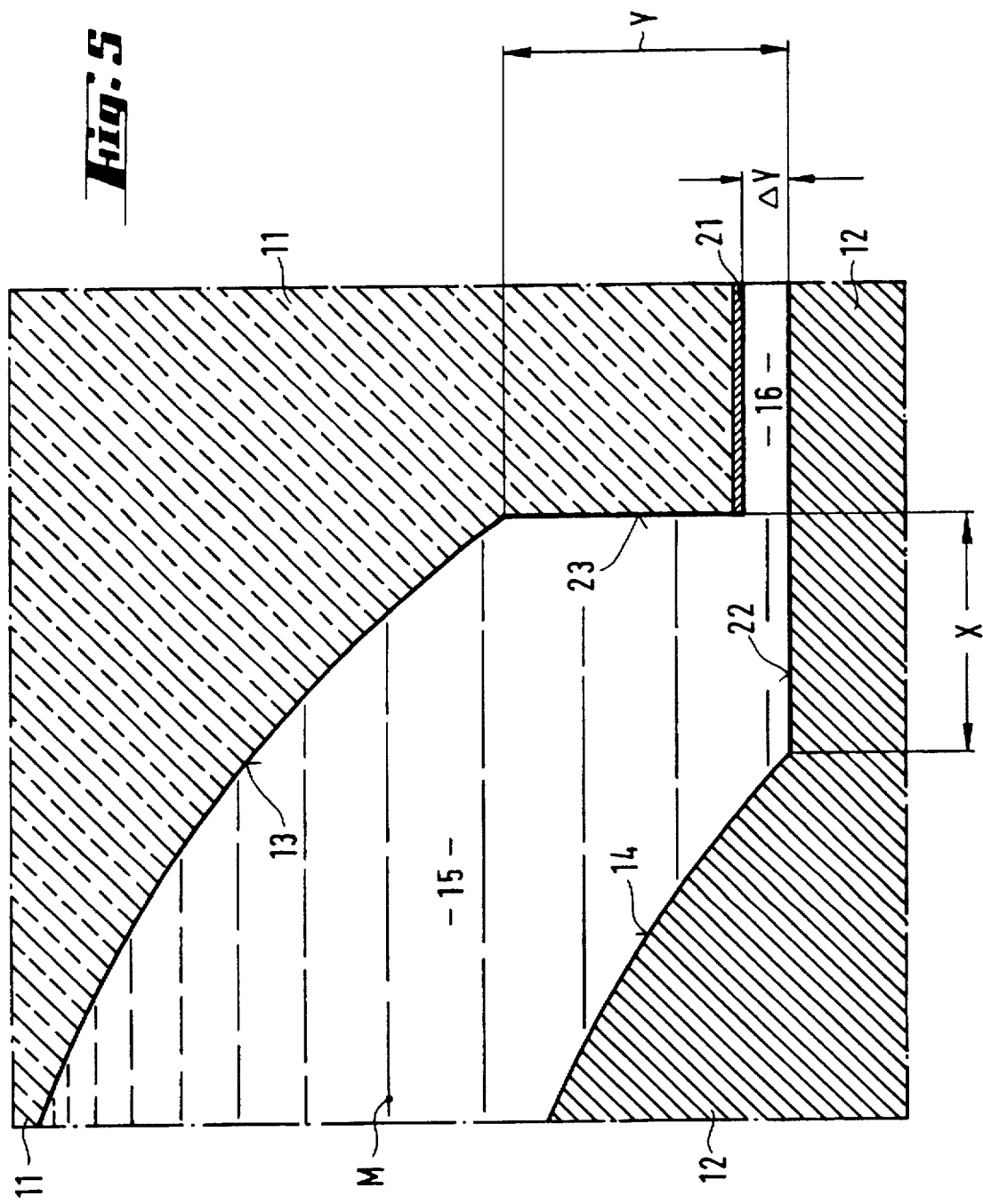
FIG. 5 is an enlarged illustration of the rim area of an example embodiment of a mould in the closed position.

As already discussed in the explanation of the individual Figures, as the mould halves are closed excess starting material is forced into the annular gap 16 between the two mould halves. The width or height ($\Delta y$) of the annular gap 16, which is shown more clearly in FIG. 5, is made sufficiently great for contact between the two mould halves 11 and 12 (or contact between the mould member 11, 11a and 11b and the container base 100, 100a and 100b respectively) in the region of the mask 21 to be avoided with absolute reliability. The positioning (spacing) of the two mould halves is effected by the spacer bolts 19 (FIGS. 1A–C).

In FIG. 5, the mould cavity 15 has, by way of example, a shape that corresponds to the typical rim geometry of a so-called soft contact lens. The cavity rim, and thus the contact lens rim, is formed here by a wall face 22 on the male mould half 12 and a wall face 23 on the female mould half 11, the two wall faces being arranged at right angles to one another. The width and height of those two wall faces, that is to say the rim areas of the contact lens defined by them, are indicated by X and Y respectively. It is obviously also possible in practice for the lens rim to be somewhat rounded.

As can be seen clearly, the wall face 23 of the mould half 11 does not quite extend up to the wall face 22 but is lower by the amount $\Delta y$ of the annular gap 16. Typical gap heights $\Delta y$ are in the range below about 100 µm for the manufacture of contact lenses. Tests have shown that, at least when parallel energy radiation is used, a clean structuring of the rim of the moulding being produced is still possible even with gap heights of approximately 1 mm. Conversely, however, the width or height of the annular gap can also readily be reduced to practically zero, provided that the mould is closed without force, that is to say that the two mould halves lie one on top of the other without external pressure. In that case only a film of uncrosslinked material a few micrometers thick remains between the two mould halves in the region of the annular gap, which, however, because of the screening from the UV radiation, likewise cannot result in the formation of flash. On crosslinking, therefore, a clean and burr-free contact lens rim is formed that does not require any subsequent mechanical processing. On account of the force-free closure of the mould, the mould is also not damaged, at least if a suitable material has been chosen, and can thus be used repeatedly.

However, even if the mould is closed with the use of force, and where necessary used only once, the device according to the invention is still distinguished from the known devices by the fact that the mould is closed in the starting material and can thus be closed more quickly without there being any risk of air inclusions.

When energy is applied from one side, the mould half remote from the energy source can, in principle, be made from any material that is compatible with the crosslinkable or cross-linked material or components thereof. If metals are used, however, depending on the nature of the energy radiation the possibility of reflections must be expected, which may possibly result in undesired effects such as over-exposure, the formation of defects at the edges, or the like. Absorbent materials do not have those disadvantages.

In principle it is also possible to exploit in a controlled manner the diffraction and/or scattering effects of the radiation impinging upon the mould in order to produce a moulding with a contour that is intentionally not sharp or has somewhat rounded edges. The same effect can also be achieved using masks with locally variable permeability. It is thus possible for sharp-edged rims of the moulding to be rounded in a controlled manner by controlled incomplete crosslinking and by partial dissolution of the incompletely crosslinked regions with a suitable solvent, which may also be the uncrosslinked starting material itself. Isopropanol, for example, is a suitable solvent when using HEMA (hydroxyethyl methacrylate) as the starting material.

Furthermore, it is clear that the device explained with reference to the Figures may also comprise several cavities instead of only one, so that several contact lenses can be produced simultaneously in one cycle. That variant is especially efficient.

In addition, in the variants with the piston-like mould member a throughflow control can be effected in a controlled manner to the effect that first of all the piston-like mould member is acted upon by force mechanically, and release of the starting material into the container as it is fed in is slightly delayed and release from the container as it is conveyed away is slightly delayed. This applies also to the variant in which both pumps are used and the piston is driven mechanically. With this measure it is possible for a reduced pressure when feeding in, and a raised pressure when conveying away, to be generated in the container in a controlled manner, or for the pressure in the container to be influenced generally in that manner.

Also possible is a variant in which the number of cycles by which a new contact lens is produced is variable. For example, a sensor can detect whether a contact lens has actually been flushed out of the mould, and only when the sensor has detected such a flushed-out contact lens is the mould fully closed and a new contact lens produced. If the sensor has not detected a flushed-out contact lens, flushing of the mould is continued until the contact lens has been flushed out of the mould.

For contact lenses CL there may be used as starting material that can be crosslinked by irradiation with UV light.

for example, the HEMA (hydroxyethyl methacrylate) or poly-HEMA used widely for such purposes, especially in admixture with a suitable crosslinker, such as, for example, ethylene glycol dimethacrylate. For other mouldings, depending on the intended use other material may possibly be used and, in principle, it is also possible for other forms of energy, for example electron radiation, gamma radiation, thermal energy etc., to be used to trigger crosslinking depending on the nature of the crosslinkable material. In the manufacture of contact lenses, materials that are crosslinkable by UV light are generally customary but not absolutely essential.

Suitable starting materials are in particular special prepolymers, especially those based on polyvinyl alcohol, that comprise cyclic acetal groups and crosslinkable groups.

Contact lenses based on polyvinyl alcohol are already known. For example, contact lenses comprising polyvinyl alcohol that has (meth)acryloyl groups bonded by way of urethane groups are disclosed, for example, in EP 216 074. Contact lenses made of polyvinyl alcohol crosslinked with polyepoxides are described in EP 189 375.

Also already known are some special acetals that comprise crosslinkable groups. Reference is made in that connection, for example, to EP 201 693, EP 215 245 and EP 211 432. EP 201 693 describes, inter alia, acetals of unbranched aldehydes having from 2 to 11 carbon atoms that carry a terminal amino group which has been substituted by a $C_3$–$C_{24}$-olefinically unsaturated organic radical. That organic radical has a functionality which removes electrons from the nitrogen atom, and also the olefinically unsaturated functionality is polymerisable. Also claimed in EP 201 693 are reaction products of the above-characterised acetals with a 1,2-diol, a 1,3-diol, a polyvinyl alcohol or a cellulose. Products of that kind are not, however, expressly described.

Inasmuch as one of the acetals according to EP 201 693 is mentioned at all in connection with, for example, polyvinyl alcohol, as is the case, inter alia, in Example 17 of that Patent Application, then the acetal polymerisable by way of its olefinic group is first copolymerised, for example, with vinyl acetate. The copolymer so obtained is then reacted with polyvinyl alcohol, and an emulsion with a pH of 5.43 and a viscosity of 11640 cps which contains 37% solids is obtained.

In contrast, according to one aspect of the present invention, the prepolymers comprise a 1,3-diol basic structure in which a certain percentage of the 1,3-diol units have been modified to a 1,3-dioxane having in the 2-position a radical that is polymerisable but not polymerised. The polymerisable radical is especially an aminoalkyl radical having a polymerisable group bonded to the nitrogen atom.

The prepolymer according to the invention is preferably a derivative of a polyvinyl alcohol having a molecular weight of at least about 2000 that, based on the number of hydroxy groups of the polyvinyl alcohol, comprises from approximately 0.5 to approximately 80% of units of formula I

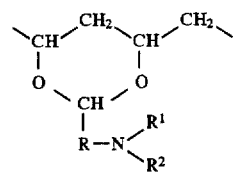

wherein

R is lower alkylene having up to 8 carbon atoms, $R^1$ is hydrogen or lower alkyl and $R^2$ is an olefinically unsaturated, electron-attracting, copolymerisable radical preferably having up to 25 carbon atoms.

$R^2$ is, for example, an olefinically unsaturated acyl radical of formula $R^3$—CO—, in which $R^3$ is an olefinically unsaturated copolymerisable radical having from 2 to 24 carbon atoms, preferably from 2 to 8 carbon atoms, especially preferably from 2 to 4 carbon atoms. In another embodiment, the radical $R^2$ is a radical of formula II

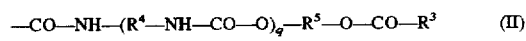

wherein q is zero or one and $R^4$ and $R^5$ are each independently lower alkylene having from 2 to 8 carbon atoms, arylene having from 6 to 12 carbon atoms, a saturated divalent cycloaliphatic group having from 6 to 10 carbon atoms, arylenealkylene or alkylenearylene having from 7 to 14 carbon atoms or arylenealkylenearylene having from 13 to 16 carbon atoms, and $R^3$ is as defined above.

The prepolymer according to the invention is therefore especially a derivative of a polyvinyl alcohol having a molecular weight of at least about 2000 that, based on the number of hydroxy groups of the polyvinyl alcohol, comprises from approximately 0.5 to approximately 80% of units of formula III

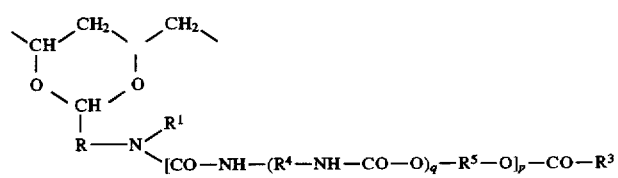

wherein

R is lower alkylene, $R^1$ is hydrogen or lower alkyl, p is zero or one, q is zero or one, $R^3$ is an olefinically unsaturated copolymerisable radical having from 2 to 8 carbon atoms and $R^4$ and $R^5$ are each independently lower alkylene having from 2 to 8 carbon atoms, arylene having from 6 to 12 carbon atoms, a saturated divalent cycloaliphatic group having from 6 to 10 carbon atoms, arylenealkylene or alkylenearylene having from 7 to 14 carbon atoms or arylenealkylenearylene having from 13 to 16 carbon atoms.

Lower alkylene R preferably has up to 8 carbon atoms and may be straight-chained or branched. Suitable examples include octylene, hexylene, pentylene, butylene, propylene, ethylene, methylene, 2-propylene, 2-butylene or 3-pentylene. Preferably lower alkylene R has up to 6 and especially preferably up to 4 carbon atoms. The meanings methylene and butylene are especially preferred.

$R^1$ is preferably hydrogen or lower alkyl having up to seven, especially up to four, carbon atoms, especially hydrogen.

Lower alkylene $R^4$ or $R^5$ preferably has from 2 to 6 carbon atoms and is especially straight-chained. Suitable examples include propylene, butylene, hexylene, dimethylethylene and, especially preferably, ethylene.

Arylene $R^4$ or $R^5$ is preferably phenylene that is unsubstituted or is substituted by lower alkyl or lower alkoxy, especially 1,3-phenylene or 1,4-phenylene or methyl-1,4-phenylene.

A saturated divalent cycloaliphatic group $R^4$ or $R^5$ is preferably cyclohexylene or cyclohexylene-lower alkylene, for example cyclohexylenemethylene, that is unsubstituted or is substituted by one or more methyl groups, such as, for example, trimethylcyclohexylenemethylene, for example the divalent isophorone radical.

The arylene unit of alkylenearylene or arylenealkylene $R^4$ or $R^5$ is preferably phenylene, unsubstituted or substituted by lower alkyl or lower alkoxy, and the alkylene unit thereof is preferably lower alkylene, such as methylene or ethylene, especially methylene. Such radicals $R^4$ or $R^5$ are therefore preferably phenylenemethylene or methylenephenylene.

Arylenealkylenearylene $R^4$ or $R^5$ is preferably phenylene-lower alkylene-phenylene having up to 4 carbon atoms in the alkylene unit, for example phenyleneethylenephenylene.

The radicals $R^4$ and $R^5$ are each independently preferably lower alkylene having from 2 to 6 carbon atoms, phenylene, unsubstituted or substituted by lower alkyl, cyclohexylene or cyclohexylene-lower alkylene, unsubstituted or substituted by lower alkyl, phenylene-lower alkylene, lower alkylene-phenylene or phenylene-lower alkylene-phenylene.

Within the scope of this invention, the term "lower" used in connection with radicals and compounds denotes radicals or compounds having up to 7 carbon atoms, preferably up to 4 carbon atoms, unless defined otherwise.

Lower alkyl has especially up to 7 carbon atoms, preferably up to 4 carbon atoms, and is, for example, methyl, ethyl, propyl, butyl or tert-butyl.

Lower alkoxy has especially up to 7 carbon atoms, preferably up to 4 carbon atoms, and is, for example, methoxy, ethoxy, propoxy, butoxy or tert-butoxy.

The olefinically unsaturated copolymerisable radical $R^3$ having from 2 to 24 carbon atoms is preferably alkenyl having from 2 to 24 carbon atoms, especially alkenyl having from 2 to 8 carbon atoms and especially preferably alkenyl having from 2 to 4 carbon atoms, for example ethenyl, 2-propenyl, 3-propenyl, 2-butenyl, hexenyl, octenyl or dodecenyl. The meanings ethenyl and 2-propenyl are preferred, so that the group —CO—$R^3$ is the acyl radical of acrylic or methacrylic acid.

The divalent group —$R^4$—NH—CO—O— is present when q is one and absent when q is zero. Prepolymers in which q is zero are preferred.

The divalent group —CO—NH—($R^4$—NH—CO—O)$_q$—$R^5$—O— is present when p is one and absent when p is zero. Prepolymers in which p is zero are preferred.

In prepolymers in which p is one the index q is preferably zero. Prepolymers in which p is one, the index q is zero and $R^5$ is lower alkylene are especially preferred.

A preferred prepolymer according to the invention is therefore especially a derivative of a polyvinyl alcohol having a molecular weight of at least about 2000 that, based on the number of hydroxy groups of the polyvinyl alcohol, comprises from approximately 0.5 to approximately 80% of units of formula III in which R is lower alkylene having up to 6 carbon atoms, p is zero and $R^3$ is alkenyl having from 2 to 8 carbon atoms.

A further preferred prepolymer according to the invention is therefore especially a derivative of a polyvinyl alcohol having a molecular weight of at least about 2000 that, based on the number of hydroxy groups of the polyvinyl alcohol, comprises from approximately 0.5 to approximately 80% of units of formula III in which R is lower alkylene having up to 6 carbon atoms, p is one, q is zero, $R^5$ is lower alkylene having from 2 to 6 carbon atoms and $R^3$ is alkenyl having from 2 to 8 carbon atoms.

A further preferred prepolymer according to the invention is therefore especially a derivative of a polyvinyl alcohol having a molecular weight of at least about 2000 that, based on the number of hydroxy groups of the polyvinyl alcohol, comprises from approximately 0.5 to approximately 80% of units of formula III in which R is lower alkylene having up to 6 carbon atoms, p is one, q is one, $R^4$ is lower alkylene having from 2 to 6 carbon atoms, phenylene, unsubstituted or substituted by lower alkyl, cyclohexylene or cyclohexylene-lower alkylene, unsubstituted or substituted by lower alkyl, phenylene-lower alkylene, lower alkylene-phenylene or phenylene-lower alkylene-phenylene, $R^5$ is lower alkylene having from 2 to 6 carbon atoms and $R^3$ is alkenyl having from 2 to 8 carbon atoms.

The prepolymers according to the invention are derivatives of polyvinyl alcohol having a molecular weight of at least about 2000 that, based on the number of hydroxy groups of the polyvinyl alcohol, comprises from approximately 0.5 to approximately 80%, especially approximately from 1 to 50%, preferably approximately from 1 to 25%, preferably approximately from 2 to 15% and especially preferably approximately from 3 to 10%, of units of formula III. Prepolymers according to the invention which are provided for the manufacture of contact lenses comprise, based on the number of hydroxy groups of the polyvinyl alcohol, especially from approximately 0.5 to approximately 25%, especially approximately from 1 to 15% and especially preferably approximately from 2 to 12%, of units of formula III.

Polyvinyl alcohols that can be derivatised in accordance with the invention preferably have a molecular weight of at least 10,000. As an upper limit the polyvinyl alcohols may have a molecular weight of up to 1,000,000. Preferably, the polyvinyl alcohols have a molecular weight of up to 300,000, especially up to approximately 100,000 and especially preferably up to approximately 50,000.

Polyvinyl alcohols suitable in accordance with the invention usually have a poly(2-hydroxy)ethylene structure. The polyvinyl alcohols derivatised in accordance with the invention may, however, also comprise hydroxy groups in the form of 1,2-glycols, such as copolymer units of 1,2-dihydroxyethylene, as may be obtained, for example, by the alkaline hydrolysis of vinyl acetate/vinylene carbonate copolymers.

In addition, the polyvinyl alcohols derivatised in accordance with the invention may also comprise small proportions, for example up to 20%, preferably up to 5%, of copolymer units of ethylene, propylene, acrylamide, methacrylamide, dimethacrylamide, hydroxyethyl methacrylate, methyl methacrylate, methyl acrylate, ethyl acrylate, vinylpyrrolidone, hydroxyethyl acrylate, allyl alcohol, styrene or similar customarily used comonomers.

Commercially available polyvinyl alcohols may be used, such as, for example, Vinol® 107 produced by Air Products (MW=22,000 to 31,000, 98–98.8% hydrolysed), Polysciences 4397 (MW=25,000, 98.5% hydrolysed), BF 14 produced by Chan Chun, Elvanol® 90-50 produced by DuPont, UF-120 produced by Unitika, Moviol® 4-88, 10-98 and 20-98 produced by Hoechst. Other manufacturers are, for example, Nippon Gohsei (Gohsenol®), Monsanto (Gelvatol®), Wacker (Polyviol®) and the Japanese manufacturers Kuraray, Denki and Shin-Etsu.

As already mentioned, it is also possible to use copolymers of hydrolysed vinyl acetate, which are obtainable, for example, in the form of hydrolysed ethylene/vinyl acetate (EVA), or vinyl chloride/vinyl acetate, N-vinylpyrrolidone/vinyl acetate and maleic acid anhydride/vinyl acetate.

Polyvinyl alcohol is usually prepared by hydrolysis of the corresponding homopolymeric polyvinyl acetate. In a preferred embodiment, the polyvinyl alcohol derivatised in accordance with the invention comprises less than 50% of polyvinyl acetate units, especially less than 20% of polyvinyl acetate units.

The compounds comprising units of formula III may be prepared in a manner known per se. For example, a polyvinyl alcohol having a molecular weight of at least about 2000 that comprises units of formula IV

—CH(OH)—CH$_2$—     (IV)

may be reacted with approximately from 0.5 to 80%, based on the number of hydroxy groups of the compound of formula IV, of a compound of formula (V)

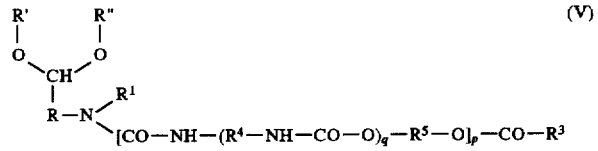

in which

R' and R" are each independently hydrogen, lower alkyl or lower alkanoyl, such as acetyl or propionyl, and the other variables are as defined for formula III, especially in an acidic medium.

Alternatively, a polyvinyl alcohol having a molecular weight of at least about 2000 that comprises units of formula IV may be reacted with a compound of formula VI

in which the variables are as defined for the compound of formula V, especially under acidic conditions, and the cyclic acetal obtainable in that manner may then be reacted with a compound of formula VII OCN—(R$^4$—NH—CO—O)$_q$—R$^5$—O—CO—R$^3$     (VII)

in which the variables are as defined for the compound of formula V.

Alternatively, the reaction product of a compound of formula IV and a compound of formula VI may be reacted, similarly to the product obtainable as described above, with a compound of formula (VIII)

X—CO—R$^3$     (VIII)

in which R$^3$ is, for example, alkenyl having from 2 to 8 carbon atoms and X is a reactive group, for example etherified or esterified hydroxy, for example halogen, especially chlorine.

Compounds of formula V in which p is zero are known, for example, from EP 201 693. Compounds of formula VI are also described therein. Compounds of formula VII are known per se, or can be prepared in a manner known per se. An example of a compound of formula VII in which q is zero is isocyanatoethyl methacrylate. An example of a compound of formula VII in which q is one is the reaction product of isophorone diisocyanate with 0.5 equivalent of hydroxyethyl methacrylate. Compounds of formula VIII are known per se; a typical representative is methacryloyl chloride. Compounds of formula V in which p and/or q are 1 can be prepared in a manner known per se from the abovementioned compounds, for example by reaction of a compound of formula VI with isocyanatoethyl methacrylate or by reaction of a compound of formula VI with isophorone diisocyanate which has previously been terminated with 0.5 equivalent of hydroxyethyl methacrylate.

Surprisingly the prepolymers of formulae I and III are extraordinarily stable. This is unexpected for the person skilled in the art because, for example, higher-functional acrylates usually have to be stabilised. If such compounds are not stabilised then rapid polymerisation usually occurs. Spontaneous crosslinking by homopolymerisation does not occur, however, with the prepolymers of the invention. The prepolymers of formulae I and III can furthermore be purified in a manner known per se, for example by precipitation with acetone, dialysis or ultrafiltration, ultrafiltration being especially preferred. By means of that purification process the prepolymers of formulae I and III can be obtained in extremely pure form, for example in the form of concentrated aqueous solutions that are free, or at least substantially free, from reaction products, such as salts, and starting materials, such as, for example, compounds of formula V or other non-polymeric constituents.

The preferred purification process for the prepolymers of the invention, ultrafiltration, can be carried out in a manner known per se. It is possible for the ultrafiltration to be carried out repeatedly, for example from two to ten times. Alternatively, the ultrafiltration can be carried out continuously until the selected degree of purity is attained. The selected degree of purity can in principle be as high as desired. A suitable measure for the degree of purity is, for example, the sodium chloride content of the solution, which can be determined simply in known manner.

The prepolymers of formulae I and III according to the invention are on the other hand crosslinkable in an extremely effective and controlled manner, especially by photocrosslinking.

In the case of photocrosslinking, appropriately a photoinitiator is added which can initiate radical crosslinking. Examples thereof are familiar to the person skilled in the art and suitable photoinitiators that may be mentioned specifically are benzoin methyl ether, 1-hydroxycyclohexylphenyl ketone, Daracure 1173 or Irgacure types. The crosslinking can then be triggered by actinic radiation, such as, for example, UV light, or ionising radiation, such as, for example, gamma radiation or X-radiation.

The photopolymerisation is suitably carried out in a solvent. A suitable solvent is in principle any solvent that dissolves polyvinyl alcohol and the vinylic comonomers optionally used in addition, for example water, alcohols, such as lower alkanols, for example ethanol or methanol, also carboxylic acid amides, such as dimethylformamide, or dimethyl sulfoxide, and also a mixture of suitable solvents, such as, for example, a mixture of water with an alcohol, such as, for example, a water/ethanol or a water/methanol mixture.

The photocrosslinking is carried out preferably directly from an aqueous solution of the prepolymers according to the invention, which can be obtained by the preferred purification step, ultrafiltration, where appropriate after the addition of an additional vinylic comonomer. For example, an approximately 15 to 40% aqueous solution can be photocrosslinked.

The process for the preparation of the polymers of the invention may comprise, for example, photocrosslinking a prepolymer comprising units of formula I or III, especially in substantially pure form, that is to say, for example, after single or repeated ultra-filtration, preferably in solution, especially in aqueous solution, in the absence or presence of an additional vinylic comonomer.

The vinylic comonomer which, in accordance with the invention, may be used in addition in the photocrosslinking, may be hydrophilic or hydrophobic, or a mixture of a hydrophobic and a hydrophilic vinylic monomer. Suitable vinylic monomers include especially those customarily used in the manufacture of contact lenses. A hydrophilic vinylic monomer denotes a monomer that typically yields as homopolymer a polymer that is water-soluble or can absorb at least 10% by weight of water. Analogously, a hydrophobic vinylic monomer denotes a monomer that typically yields as homopolymer a polymer that is water-insoluble and can absorb less than 10% by weight of water.

Generally, approximately from 0.01 to 80 units of a typical vinylic comonomer react per unit of formula I or III.

If a vinylic comonomer is used, the crosslinked polymers according to the invention preferably comprise approximately from 1 to 15%, especially preferably approximately from 3 to 8%, of units of formula I or III, based on the number of hydroxy groups of the polyvinyl alcohol, which are reacted with approximately from 0.1 to 80 units of the vinylic monomer.

The proportion of the vinylic comonomers, if used, is preferably from 0.5 to 80 units per unit of formula I, especially from 1 to 30 units per unit of formula I, and especially preferably from 5 to 20 units per unit of formula I.

It is also preferable to use a hydrophobic vinylic comonomer or a mixture of a hydrophobic vinylic comonomer with a hydrophilic vinylic comonomer, the mixture comprising at least 50% by weight of a hydrophobic vinylic comonomer. In that manner the mechanical properties of the polymer can be improved without the water content falling substantially. In principle, however, both conventional hydrophobic vinylic comonomers and conventional hydrophilic vinylic comonomers are suitable for the copolymerisation with polyvinyl alcohol comprising groups of formula I.

Suitable hydrophobic vinylic comonomers include, without the list being exhaustive, $C_1$–$C_{18}$alkyl acrylates and methacrylates, $C_3$–$C_{18}$alkyl acrylamides and methacrylamides, acrylonitrile, methacrylonitrile, vinyl-$C_1$–$C_{18}$alkanoates, $C_2$–$C_{18}$alkenes, $C_2$–$C_{18}$haloalkenes, styrene, $C_1$–$C_6$alkylstyrene, vinyl alkyl ethers, in which the alkyl moiety contains from 1 to 6 carbon atoms, $C_2$–$C_{10}$perfluoroalkyl acrylates and methacrylates or correspondingly partially fluorinated acrylates and methacrylates, $C_3$–$C_{12}$perfluoroalkyl-ethylthiocarbonylaminoethyl acrylates and methacrylates, acryloxy- and methacryloxy-alkylsiloxanes, N-vinylcarbazole, $C_1$–$C_{12}$alkyl esters of maleic acid, fumaric acid, itaconic acid, mesaconic acid and the like. $C_1$–$C_4$alkyl esters of vinylically unsaturated carboxylic acids having from 3 to 5 carbon atoms or vinyl esters of carboxylic acids having up to 5 carbon atoms, for example, are preferred.

Examples of suitable hydrophobic vinylic comonomers include methyl acrylate, ethyl acrylate, propyl acrylate, isopropyl acrylate, cyclohexyl acrylate, 2-ethylhexyl acrylate, methyl methacrylate, ethyl methacrylate, propyl methacrylate, vinyl acetate, vinyl propionate, vinyl butyrate, vinyl valerate, styrene, chloroprene, vinyl chloride, vinylidene chloride, acrylonitrile, 1-butene, butadiene, methacrylonitrile, vinyltoluene, vinyl ethyl ether, perfluorohexylethylthiocarbonylaminoethyl methacrylate, isobornyl methacrylate, trifluoroethyl methacrylate, hexafluoroisopropyl methacrylate, hexafluorobutyl methacrylate, tris-trimethylsilyloxy-silyl-propyl methacrylate, 3-methacryloxypropylpentamethyldisiloxane and bis(methacryloxypropyl)tetramethyldisiloxane.

Suitable hydrophilic vinylic comonomers include, without the list being exhaustive, hydroxy-substituted lower alkyl acrylates and methacrylates, acrylamide, methacrylamide, lower alkyl acrylamides and methacrylamides, ethoxylated acrylates and methacrylates, hydroxy-substituted lower alkyl acrylamides and methacrylamides, hydroxy-substituted lower alkyl vinyl ethers, sodium ethylenesulfonate, sodium styrenesulfonate, 2-acrylamido-2-methylpropanesulfonic acid, N-vinylpyrrole, N-vinylsuccinimide, N-vinylpyrrolidone, 2- or 4-vinylpyridine, acrylic acid, methacrylic acid, amino-(the term "amino" also including quaternary ammonium), mono-lower alkylamino- or di-lower alkylamino-lower alkyl acrylates and methacrylates, allyl alcohol and the like. Hydroxy-substituted $C_2$–$C_4$alkyl(meth)acrylates, five- to seven-membered N-vinyl lactams, N,N-di-$C_1$–$C_4$alkyl (meth)acrylamides and vinylically unsaturated carboxylic acids having a total of from 3 to 5 carbon atoms, for example, are preferred.

Examples of suitable hydrophilic vinylic comonomers include hydroxyethyl methacrylate, hydroxyethyl acrylate, acrylamide, methacrylamide, dimethylacrylamide, allyl alcohol, vinylpyridine, vinylpyrrolidone, glycerol methacrylate, N-(1,1-dimethyl-3-oxobutyl)acrylamide, and the like.

Preferred hydrophobic vinylic comonomers are methyl methacrylate and vinyl acetate.

Preferred hydrophilic vinylic comonomers are 2-hydroxyethyl methacrylate, N-vinylpyrrolidone and acrylamide.

EXAMPLES

In the following Examples, unless expressly stated otherwise amounts are amounts by weight, and temperatures are in degrees Celsius. The Examples are not intended to limit the invention in any way, for instance to the scope of the Examples.

Example 1a)

Over a period of 4 hours, 104.5 parts of methacryloyl chloride dissolved in 105 parts of dichloromethane are added dropwise at a maximum of 15° C., while cooling with ice, to 105.14 parts of aminoacetaldehyde dimethylacetal and 101.2 parts of triethylamine in 200 parts of dichloromethane. When the reaction is complete, the dichloromethane phase is washed with 200 parts of water then with 200 parts of 1N HCl solution, and then twice with 200 parts of water. After drying with anhydrous magnesium sulfate, the dichloromethane phase is concentrated by evaporation and stabilised with 0.1% of 2,6-di-tert-butyl-p-cresol, based on the reaction product. After distillation at 90° C./$10^{-3}$ mbar, 112 g of methacrylamidoacetaldehyde dimethylacetal are obtained in the form of a colourless liquid, boiling point 92° C./$10^{-3}$ mbar (65% yield).

Example 1b)

52.6 g of aminoacetaldehyde dimethylacetal are dissolved in 150 ml of deionised water and cooled to 5° C. with ice. Subsequently, 50 ml of methacrylic acid chloride and 50 ml of 30% sodium hydroxide solution are simultaneously so added over a period of 40 minutes that the pH value remains at 10 and the temperature does not exceed 20° C. When the addition is complete, the remaining content of aminoacetaldehyde dimethylacetal is determined as 0.18% by gas chromatography. The amine is reacted fully by the further addition of 2.2 ml of methacrylic acid chloride and 2.0 ml of 30% sodium hydroxide solution. The solution is then neutralised with 1N hydrochloric acid (pH=7). The aqueous phase is extracted with 50 ml of petroleum ether and washed with water. The petroleum ether phase contains 3.4 g of secondary product. The aqueous phases are combined and yield 402.8 g of a 20.6% solution of methacrylamidoacetaldehyde dimethylacetal. According to a gas chromatogram, the product is 98.2%.

Example 2

10 parts of polyvinyl alcohol having a molecular weight of 22,000 and a degree of hydrolysis of 97.5–99.5% are dissolved in 90 parts of water. 2.5 parts of methacrylamidoacetaldehyde dimethylacetal are added and the mixture is acidified with 10 parts of concentrated hydrochloric acid. The solution is stabilised with 0.02 parts of 2,6-di-tert-butyl-p-cresol. After stirring for 20 hours at room temperature, the solution is adjusted to pH 7 with 10% sodium hydroxide solution and then ultrafiltered seven times using a 3 kD membrane (ratio 1:3). After concentration, an 18.8% aqueous solution of methacrylamidoacetaldehydo-1,3-acetal of polyvinyl alcohol having a viscosity of 2240 cP at 25° C. is obtained.

Example 3

10 parts of the solution of methacrylamidoacetaldehydo-1,3-acetal of polyvinyl alcohol obtained in accordance with Example 2 are photochemically crosslinked by adding 0.034 parts of Darocure 1173 (CIBA-GEIGY) thereto. The mixture is irradiated in the form of a 100 micron thick layer between two glass plates with 200 pulses of a 5000 watt irradiation device produced by Staub. A solid transparent film with a solids content of 31% is obtained.

Example 4

110 g of polyvinyl alcohol (Moviol 4-88, Hoechst) are dissolved at 90° C. in 440 g of deionised water and cooled to 22° C. 100.15 g of a 20.6% aqueous solution of methacrylamidoacetaldehyde dimethylacetal, 38.5 g of concentrated hydrochloric acid (37% p.a., Merck) and 44.7 g of deionised water are added thereto. The mixture is stirred at room temperature for 22 hours and then adjusted to pH 7.0 with a 5% NaOH solution. The solution is diluted to 3 liters with deionised water, filtered and ultrafiltered using a 1-KD-Omega membrane produced by Filtron. After the three-fold specimen volume has permeated, the solution is concentrated. 660 g of a 17.9% solution of the methacrylamidoacetaldehydo-1,3-acetal of polyvinyl alcohol having a viscosity of 210 cp are obtained. The inherent viscosity of the polymer is 0.319. The nitrogen content is 0.96%. According to NMR investigation, 11 mol % of the OH groups have been acetalised and 5 mol % of the OH groups acetylated. Concentration of the aqueous polymer solution under reduced pressure and with air draft yields a 30.8% solution having a viscosity of 3699 cp.

Example 5

66.6 g of deionised water, 3.3 g of monomeric 4-methacrylamidobutyraldehyde diethylacetal and 20.0 g of concentrated hydrochloric acid (37% p.a., Merck) are added to 133.3 g of a 15% polyvinyl alcohol solution (Moviol 4-88, Hoechst) and the mixture is stirred at room temperature for 8 hours. The solution is then adjusted to pH 7 with 5% sodium hydroxide solution. After ultrafiltration of the solution using a 3-KD-Omega membrane produced by Filtron, the sodium chloride content of the polymer solution being reduced from 2.07% to 0.04%, a 20% polymer solution of the methacrylamidobutyraldehydo-1,3-acetal of polyvinyl alcohol having a viscosity of 400 cp is obtained. The inherent viscosity of the polymer is 0.332. The nitrogen content is 0.41%. According to NMR investigation, 7.5 mol % of the OH groups are charged with acetal groups and 7.3 mol % of the OH groups are charged with acetate groups.

Example 6

2.4 g (14.8 mmol) of aminobutyraldehyde diethylacetal (Fluka) and 20 g of concentrated hydrochloric acid (37% p.a., Merck) are added to 200 g of a 10% polyvinyl alcohol solution (Moviol 4-88, Hoechst). The solution is stirred at room temperature for 48 hours and then neutralised with 10% sodium hydroxide solution. The solution is diluted to 400 ml. 200 ml of the solution are further processed in accordance with Example 7. 0.85 g (8.1 mmol) of methacrylic acid chloride (Fluka) is added to the remaining 200 ml of the solution and the pH value is maintained at 10 with 2N sodium hydroxide solution. After 30 minutes at room temperature, the pH is adjusted to 7.0 and the solution is purified analogously to Example 5 using a 3-KD-Omega membrane produced by Filtron. Concentration yields a 27.6% polymer solution of the methacrylamidobutyraldehydo-1,3-acetal of polyvinyl alcohol having a viscosity of 2920 cp. The inherent viscosity of the polymer is 0.435. The nitrogen content is 0.59%.

Example 7

1.3 g (8.5 mmol) of 2-isocyanatoethyl methacrylate are added to 200 ml of the polymer solution of Example 6 and the pH maintained at 10 with 2N sodium hydroxide solution. After 15 minutes at room temperature the solution is neutralised with 2N hydrochloric acid and ultrafiltered analogously to Example 6. Concentration yields a 27.1% polymer solution of the 4-(2-methacryloylethyl-ureido) butyraldehydo-1,3-acetal of polyvinyl alcohol having a viscosity of 2320 cp. The inherent viscosity of the polymer is 0.390. The nitrogen content is 1.9%.

Example 8

0.7% Darocur 1173 (based on the content of polymer) is added to the 30.8% polymer solution according to Example 4 having a viscosity of approximately 3600 cp. The solution is introduced into a transparent contact lens mould of polypropylene and the mould is closed. The solution is irradiated for 6 seconds from a distance of 18 cm using a 200 watt Oriel UV lamp. The mould is opened and the finished contact lens can be removed. The contact lens is transparent and has a water content of 61%. The modulus is 0.9 mPa, the flexural elongation (DIN 53 371) 50%. The contact lens is autoclaved for 40 minutes at 121° C. No changes in shape can be detected in a contact lens treated in that manner.

Example 9

0.0268 g of Darocur 1173 (0.7% based on the polymer content) and 0.922 g of methyl methacrylate are added to 10.00 g of a 27.1% polymer solution according to Example 7. After the addition of 2.3 g of methanol a clear solution is obtained. That solution is irradiated for a period of 14 seconds analogously to Example 8, using a 200 watt Oriel lamp. A transparent contact lens having a water content of 70.4% is obtained.

Example 10

1.04 g of acrylamide and 0.03 g of Darocur 1173 are added to 12.82 g of a 24.16% solution of the prepolymer of Example 4. The clear solution is then irradiated for 14 seconds analogously to Example 8, using a 200 watt Oriel lamp. A contact lens having a water content of 64.4% is obtained.

The polymers according to the invention can be processed in a manner known per se into mouldings, especially contact lenses, for example by carrying out the photocrosslinking of the prepolymers according to the invention in contact lens moulds in the manner described in detail further above. Further examples of mouldings according to the invention, besides contact lenses, are biomedicinal or especially ophthalmic mouldings, for example intraocular lenses, eye bandages, mouldings that can be used in surgery, such as heart valves, artificial arteries or the like, and also films or membranes, for example membranes for diffusion control, photostructurizable films for information storage, or photoresist materials, for example membranes or mouldings for etch resist or screen printing resist.

Contact lenses that comprise a polymer according to the invention as described above or consist substantially or wholly of such a polymer have a wide range of unusual and extremely advantageous properties, which include, for example, their excellent compatibility with the human cornea, which is based on a balanced relationship of water content, oxygen permeability and mechanical properties. The contact lenses according to the invention furthermore exhibit a high degree of dimensional stability. No changes in shape are detected even after autoclaving at, for example, about 120° C.

Attention may also be drawn to the fact that such contact lenses can, as described, be produced in a very simple and efficient manner compared with the state of the art. This is as a result of several factors. First, the starting materials can be obtained or produced at a favourable cost. Secondly, there is the advantage that the prepolymers are surprisingly stable, so that they can be subjected to a high degree of purification. It is therefore possible to use for the crosslinking a material that requires practically no subsequent purification, such as especially a complicated extraction of unpolymerised constituents.

Also, the polymerisation can be carried out in aqueous solution, so that a subsequent hydration step is not necessary. Finally, the photopolymerisation occurs within a short period, so that the process for manufacturing the contact lenses according to the invention can be organised to be extremely economical from that point of view also.

All of the advantages mentioned above naturally apply not only to contact lenses but also to other mouldings according to the invention. Taking into account all the various advantageous aspects in the manufacture of the mouldings according to the invention it can be seen that the mouldings according to the invention are especially suitable as mass-produced articles, such as, for example, contact lenses that are worn for a short time and then replaced by new lenses.

What is claimed is:

1. A process for the manufacture of mouldings from a starting material that is crosslinkable by the impingement of suitable energy in a mould, wherein the mould is at least partially permeable to the energy and comprises two mould halves, each of the mould halves having a shape-forming surface and the shape-forming surfaces of the two mould halves forming a mould cavity, the process comprising the steps of:
    (a) filling the mould cavity with the starting material in a still at least partially uncrosslinked state, and
    (b) impinging the crosslinking energy to crosslink the starting material in the mould cavity to form a moulding,
        wherein the filling of the mould cavity is carried out while the shape-forming surfaces are immersed in the starting material such that the shape-forming surfaces of the mould cavity are continuously immersed in the starting material during the filling and impinging steps.

2. A process according to claim 1, wherein for filling the mould cavity the cavity is connected to a reservoir which surrounds it, in which the starting material is stored and from which the mould cavity is flooded.

3. A process according to claim 1, wherein the mould is immersed in the starting material.

4. A process according to claim 1, wherein a mould is used that comprises a container and a mould member that is displaceable in that container and can be moved away from and towards the container wall lying opposite it for the purpose of opening and closing the mould, starting material being fed in between the container wall and the mould member as the mould is opened and conveyed away again as the mould is closed.

5. A process according to claim 4, wherein the container wall has one of the shape-forming surfaces and the displaceable mould member has the other shape-forming surface.

6. A process according to claim 4, wherein pumps are used to feed in and convey away the starting material.

7. A process according to claim 4, wherein the displaceable mould member is driven in order to feed in and convey away the starting material.

8. A process according to claim 1, wherein the moulding is capable of being released from the mould by flushing out the mould with starting material.

9. A process according to claim 4, wherein the moulding is separated from the mould by the flow of starting material as the mould is opened and is flushed out of the mould by the flow of starting material as the mould is closed.

10. A process according to claim 8, wherein in a first cycle, the mould is opened and closed, then the crosslinking energy is impinged, and, in a second cycle, the mould is opened again, the moulding being separated form the mould and the mould member then being moved back towards the opposite-lying container wall in order to close the mould, in the course of which the moulding is flushed out of the mould.

11. A process according to claim 1, wherein the moulding is removed from the mould by means of a gripping device.

12. A process according to claim 4, wherein the moulding removed from the mould by the gripping device is deposited on the displaceable mould member outside the space between the displaceable mould member and the opposite-lying container wall.

13. A process according to claim 12, wherein the moulding deposited on the displaceable mould member is held fast thereto by negative pressure and then released from it by positive pressure.

14. A process according to claim 1, wherein the mould is not fully closed after the introduction of the starting material into the mould cavity, so that an annular gap containing uncrosslinked starting material remains open, which gap surrounds the mould cavity and is in communication with that mould cavity.

15. A process according to claim 14, wherein the mould is closed further following crosslinking shrinkage as crosslinking of the material progresses.

16. A process according to claim 15, wherein a starting material that is of at least viscous flowability prior to the crosslinking is used, and wherein starting material can flow back through the annular gap into the mould cavity to compensate for shrinkage.

17. A process according to claim 1, wherein the starting material is a prepolymer that is a derivative of a polyvinyl alcohol having a molecular weight of at least about 2000 that, based on the number of hydroxy groups of the polyvinyl alcohol, comprises from approximately 0.5 to approximately 80% of units of

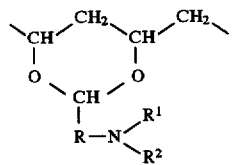

(I)

wherein

R is lower alkylene having up to 8 carbon atoms, $R^1$ is hydrogen or lower alkyl and $R^2$ is an olefinically unsaturated, electron-attracting, copolymerisable radical having up to 25 carbon atoms.

18. A process according to claim 17, wherein the starting material is a prepolymer wherein $R^2$ is an olefinically unsaturated acyl radical of the formula $R^3$—CO—, in which $R^3$ is an olefinically unsaturated copolymerisable radical having from 2 to 24 carbon atoms.

19. A process according to claim 18, wherein the starting material is a prepolymer wherein $R^3$ is alkenyl having from 2 to 8 carbon atoms.

20. A process according to claim 17, wherein the starting material is a prepolymer wherein the radical $R^2$ is a radical of formula II

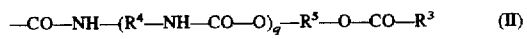

(II)

wherein q is zero or one and $R^4$ and $R^5$ are each independently lower alkylene having from 2 to 8 carbon atoms, arylene having from 6 to 12 carbon atoms, a saturated divalent cycloaliphatic group having from 6 to 10 carbon atoms, arylenealkylene-arylene having from 13 to 16 carbon atoms, and $R^3$ is an olefinically unsaturated copolymerisable radical having from 2 to 24 carbon atoms.

21. A process according to claim 17 wherein the starting material is a derivative of a polyvinyl alcohol having a molecular weight of at least about 2000 that, based on the number of hydroxy groups of the polyvinyl alcohol, comprises from approximately 0.5 to approximately 80% of units of formula III

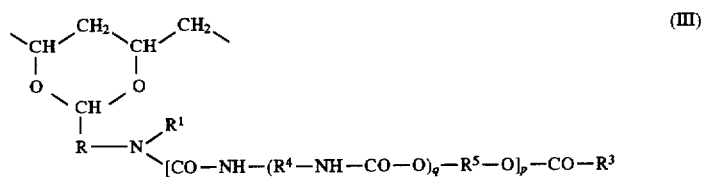

(III)

wherein

R is lower alkylene, $R^1$ is hydrogen or lower alkyl, p is zero or one, q is zero or one, $R^3$ is an olefinically unsaturated copolymerisable radical having from 2 to 8 carbon atoms and $R^4$ and $R^5$ are each independently lower alkylene having from 2 to 8 carbon atoms, arylene having from 6 to 12 carbon atoms, a saturated divalent cycloaliphatic group having from 6 to 10 carbon atoms, arylenealkylene or alkylenearylene having from 7 to 14 carbon atoms or arylenealkylenearylene having from 13 to 16 carbon atoms.

22. A process according to claim 21, wherein the starting material is a prepolymer wherein R is lower alkylene having up to 6 carbon atoms, p is zero and $R^3$ is alkenyl having from 2 to 8 carbon atoms.

23. A process according to claim 21, wherein the starting material is a prepolymer wherein R is lower alkylene having up to 6 carbon atoms, p is one, q is zero, $R^5$ is lower alkylene having from 2 to 6 carbon atoms and $R^3$ is alkenyl having from 2 to 8 carbon atoms.

24. A process according to claim 21, wherein the starting material is a prepolymer wherein R is lower alkylene having up to 6 carbon atoms, p is one, q is one, $R^4$ is lower alkylene having from 2 to 6 carbon atoms, phenylene, unsubstituted or substituted by lower alkyl, cyclohexylene or cyclohexylene-lower alkylene, unsubstituted or substituted by lower alkyl, phenylene-lower alkylene, lower alkylene-phenylene or phenylene-lower alkylene-phenylene, $R^5$ is lower alkylene having from 2 to 6 carbon atoms and $R^3$ is alkenyl having from 2 to 8 carbon atoms.

25. A process according to claim 17, wherein the starting material is a derivative of a polyvinyl alcohol having a molecular weight of at least about 2000 that, based on the number of hydroxy groups of the polyvinyl alcohol, comprises from approximately 1 to approximately 15% of units of formula I.

26. A device for the manufacture of mouldings having a closable and openable mould, the mould comprising shape-forming surfaces that form a mould cavity when the mould is closed, which mould is intended to receive a crosslinkable starting material and is at least partially permeable to energy that causes the crosslinking of the starting material and is supplied from the outside;

means for filling the mould cavity;

an energy source; and means for the impingement of the energy upon the mould, wherein the shape-forming surfaces of the mould cavity are continuously immersed in the starting material during the manufacture of the moulding.

27. A device according to claim 26, which comprises a reservoir for supplying the starting material, which reservoir surrounds the mould cavity and is capable of being connected to the mould cavity, and wherein during filling of the mould cavity the reservoir is connected to the mould cavity and floods that cavity.

28. A device according to claim 26, which comprises means closing the mould arranged in the starting material.

29. A device according to claim 26, wherein the mould comprises a container and a mould member displaceable in that container, which mould member can be moved away from and towards the container wall lying opposite it for the purpose of opening and closing the mould, and wherein there is provided in the container an inlet through which starting material flows in between the container wall and the mould member as the mould is opened, and wherein there is provided in the container an outlet through which starting material flows out again as the mould is closed.

30. A device according to claim 29, wherein the mould comprises two mould halves, one mould half being provided on the container wall and the other on the displaceable mould member.

31. A device according to claim 30, wherein the mould comprises a male mould half and a female mould half, and wherein the male mould half is provided on the container wall and the female mould half is provided on the displaceable mould member.

32. A device according to claim 29, wherein pumps are provided which, as the mould is opened, feed in starting material through the inlet and between the container wall and the mould member and, as the mould is closed, convey starting material away again through the outlet.

33. A device according to claim 29, wherein means are provided for driving the displaceable mould member.

34. A device according to claim 26, wherein means are provided for producing a flow that separates the moulding from the mould when the mould is opened and flushes the moulding out of the mould when the mould is closed.

35. A device according to claim 26, wherein a gripping device is provided which removes the crosslinked moulding from the mould.

36. A device according to claim 29, wherein the container comprises, on a container wall other than the shape-giving face, a hollow or recess that extends substantially in the direction of movement of the displaceable mould member, a gripping device being arranged in that hollow or recess, and wherein the displaceable mould member comprises, on an outer wall that does not lie opposite the shape-giving container wall, an indentation in which the gripping device deposits the removed moulding.

37. A device according to claim 36, wherein the displaceable mould member comprises a channel that leads to the indentation and can be connected to a negative pressure or positive pressure source, which channel is connected to the negative pressure source when the gripping device deposits the removed moulding in the indentation of the mould member and then is connected to the positive pressure source in order to release the lens.

38. A device according to claim 30, wherein the mould is provided with spacers that hold the two mould halves a small distance apart from one another when the mould is in the closed position, so that an annular gap is formed that surrounds the mould cavity and is in communication with that cavity.

39. A device according to claim 38, wherein the mould is provided with resilient means or displacement means that allow the two mould halves to move closer together following crosslinking shrinkage.

40. A process according to claim 8, wherein the moulding is separated from the mould by the flow of starting material as the mould is opened and is flushed out of the mould by the flow of starting material as the mould is closed.

41. A process according to claim 11, wherein the moulding removed from the mould by the gripping device is deposited on the displaceable mould member outside the space between the displaceable mould member and the opposite-lying container wall.

42. A device according to claim 35, wherein the container comprises, on a container wall other than the shape-giving face, a hollow or recess that extends substantially in the direction of movement of the displaceable mould member, the gripping device being arranged in that hollow or recess, and wherein the displaceable mould member comprises, on an outer wall that does not lie opposite the shape-giving container wall, an indentation in which the gripping device deposits the removed moulding.

43. A process of claim 1, wherein the moulding is an optical lens.

44. A process of claim 43, wherein the moulding is a contact lens.

45. A process of claim 18, wherein $R^3$ is an olefinically unsaturated copolymerisable radical having from 2 to 8 carbon atoms.

46. A process of claim 45, wherein $R^3$ is an olefinically unsaturated copolymerisable radical having from 2 to 4 carbon atoms.

47. A process of claim 20, wherein $R^3$ is an olefinically unsaturated copolymerisable radical having from 2 to 8 carbon atoms.

48. A process of claim 47, wherein $R^3$ is an olefinically unsaturated copolymerisable radical having from 2 to 4 carbon atoms.

49. A process for the manufacture of a molding, comprising the steps of:

(1) providing a male mold half having a first shape-forming surface and a female mold half having a second shape-forming surface, which shape-forming surfaces form a mold cavity when mated, wherein said mold is at least partially permeable to the crosslinking energy;

(2) introducing a starting material, which is crosslinkable by the impingement of suitable energy, into said mold cavity while said shape-forming surfaces of the mold halves are continuously immersed in the starting material during the introducing step, thereby inhibiting the formation of bubbles in said mold cavity;

(3) mating said male and female mold halves to form said mold cavity; and (4) impinging crosslinking energy upon the starting material in said mold cavity, thereby forming a molding.

50. A process of claim 49, wherein said molding is an optical lens.

51. A process of claim 50, wherein said molding is a contact lens.

52. A process of claim 49, wherein the entire face of the female mold half which includes the shape-forming surface of the female mold half and the entire face of the male mold half which includes the shape-forming surface of the male mold half are continuously immersed in said starting material during said process, thereby eliminating inclusion of bubbles in the starting material in the mold cavity which results from contact of a shape-forming surface with the surrounding atmosphere.

53. A process of claim 49, wherein said female mold half is affixed to the bottom of a container holding said starting material, and said male mold half is affixed to a means for displacing said male mold half relative to said female mold half, wherein said mating step comprises displacing said male mold half towards said female mold half until a mating position is achieved.

54. A process of claim 49, wherein said male mold half is affixed to the bottom of a container holding said starting material, and said female mold half is affixed to a means for displacing said female mold half relative to said male mold half, wherein said mating step comprises displacing said female mold half towards said male mold half until a mating position is achieved.

* * * * *